United States Patent
Yamamoto

(10) Patent No.: US 9,619,485 B2
(45) Date of Patent: Apr. 11, 2017

(54) DOCUMENT RETRIEVING APPARATUS, DOCUMENT RETRIEVING METHOD, PROGRAM, AND STORAGE MEDIUM

(75) Inventor: Masahito Yamamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1245 days.

(21) Appl. No.: 13/619,244

(22) Filed: Sep. 14, 2012

(65) Prior Publication Data

US 2013/0013988 A1 Jan. 10, 2013

Related U.S. Application Data

(63) Continuation of application No. 11/845,958, filed on Aug. 28, 2007, now Pat. No. 8,291,317.

(30) Foreign Application Priority Data

Dec. 13, 2006 (JP) .................................. 2006-336375

(51) Int. Cl.
*G06F 17/00* (2006.01)
*G06F 17/30* (2006.01)

(52) U.S. Cl.
CPC .............................. *G06F 17/30244* (2013.01)

(58) Field of Classification Search
CPC ........ G06F 17/30247; G06F 17/30277; H04N 1/00448; H04N 1/00456; H04N 1/00458; H04N 1/00461
See application file for complete search history.

(56) References Cited

U.S. PATENT DOCUMENTS

| 6,061,150 A | 5/2000 | Yamamoto |
| 6,363,179 B1 | 3/2002 | Evans et al. |
| 6,424,429 B1 | 7/2002 | Takahashi et al. |

(Continued)

FOREIGN PATENT DOCUMENTS

| JP | 61294583 A | 12/1986 |
| JP | 04-336671 A | 11/1992 |

(Continued)

OTHER PUBLICATIONS

Rao R., et al.: "Rich Interaction in the Digital Library" Communications of the Association for Computing Machinery, ACM, New York, NY, US, vol. 38, No. 4, Apr. 1, 1995 (Apr. 1, 1995), pp. 29-39.

(Continued)

*Primary Examiner* — Alvin Tan
(74) *Attorney, Agent, or Firm* — Fitzpatrick, Cella, Harper & Scinto

(57) ABSTRACT

A document retrieving apparatus includes a document retrieving unit adapted to retrieve document data which include images that match an input retrieval condition, a retrieval result list display unit adapted to display, on a display unit, a list display of document data that match the retrieval condition based on the retrieval results of the document retrieving unit, and a thumbnail display unit adapted to display, in the list display by the retrieval result list display unit, a first thumbnail image associated with a page or an image element which matches the retrieval condition, and a second thumbnail image associated with another page or another image element which forms the document data that includes the page or the image element which match the retrieval condition.

7 Claims, 19 Drawing Sheets

(56) References Cited

U.S. PATENT DOCUMENTS

| | | |
|---|---|---|
| 6,466,237 B1 | 10/2002 | Miyao et al. |
| 6,694,487 B1 | 2/2004 | Ilsar |
| 6,895,552 B1 | 5/2005 | Balabanovic et al. |
| 7,412,647 B2 | 8/2008 | Sellers et al. |
| 7,555,729 B2 | 6/2009 | Mifune et al. |
| 7,689,933 B1 | 3/2010 | Parsons |
| 7,861,166 B1 | 12/2010 | Hendricks |
| 2006/0050985 A1 | 3/2006 | Hardy et al. |
| 2006/0069670 A1 | 3/2006 | Khaliq et al. |
| 2006/0230362 A1 | 10/2006 | Matsusaka |
| 2007/0078832 A1 | 4/2007 | Ott, IV et al. |
| 2007/0094615 A1 | 4/2007 | Endo et al. |
| 2008/0239329 A1 | 10/2008 | Kitada et al. |

FOREIGN PATENT DOCUMENTS

| | | | |
|---|---|---|---|
| JP | 6162084 | A | 6/1994 |
| JP | 6-243172 | A | 9/1994 |
| JP | 6266347 | A | 9/1994 |
| JP | 2002063215 | A | 2/2002 |
| JP | 3486452 | B2 | 1/2004 |
| JP | 2004-038699 | A | 2/2004 |
| JP | 2004-157668 | A | 6/2004 |
| JP | 2005-244684 | A | 9/2005 |
| JP | 3691962 | B2 | 9/2005 |
| JP | 2006-065866 | A | 3/2006 |
| KR | 2002-0036531 | A | 5/2002 |
| KR | 2003-0029410 | A | 4/2003 |

OTHER PUBLICATIONS

Hearst M.A., Katz I.R., et al. Association for Computing Machinery: "Tilebars: Visualization of Term Distribution Information in Full Text Information Access" Human Factors in Computing Systems. Chi '95 Conference Proceedings. Denver, May 7-11, 1995, Conference on Human Factors in Computing Systems, New York, ACM, US, May 7, 1995 (May 7, 1995), pp. 59-66, ISBN: 0-201-84705-1.

Woodruff, et al. Association for Computing Machinery: "Using Thumbnails to Search the Web", CHI 2001 Conference Proceedings. Conference on Human Factors in Computing Systems. Seattle, WA, Mar. 31-Apr. 5, 2001, CHI Conference Proceedings. Human Factors in Computing Systems, New York, NY: IEEE, US, Mar. 31, 2001, pp. 198-205, ISBN: 1-58113-327-8.

European Search Report dated Jan. 2, 2008 in European Application No. 07114765.6.

Korean Office Action dated Jan. 22, 2009 in Korean Application No. 10-2007-0096165.

Japanese Office Action dated Nov. 21, 2011 in Japanese Application No. 2006-336375.

Japanese Office Action dated Jul. 6, 2012 in Japanese Application No. 2006-336375.

Japanese Office Action dated Oct. 19, 2012, in corresponding Japanese Application No. 2006-336375.

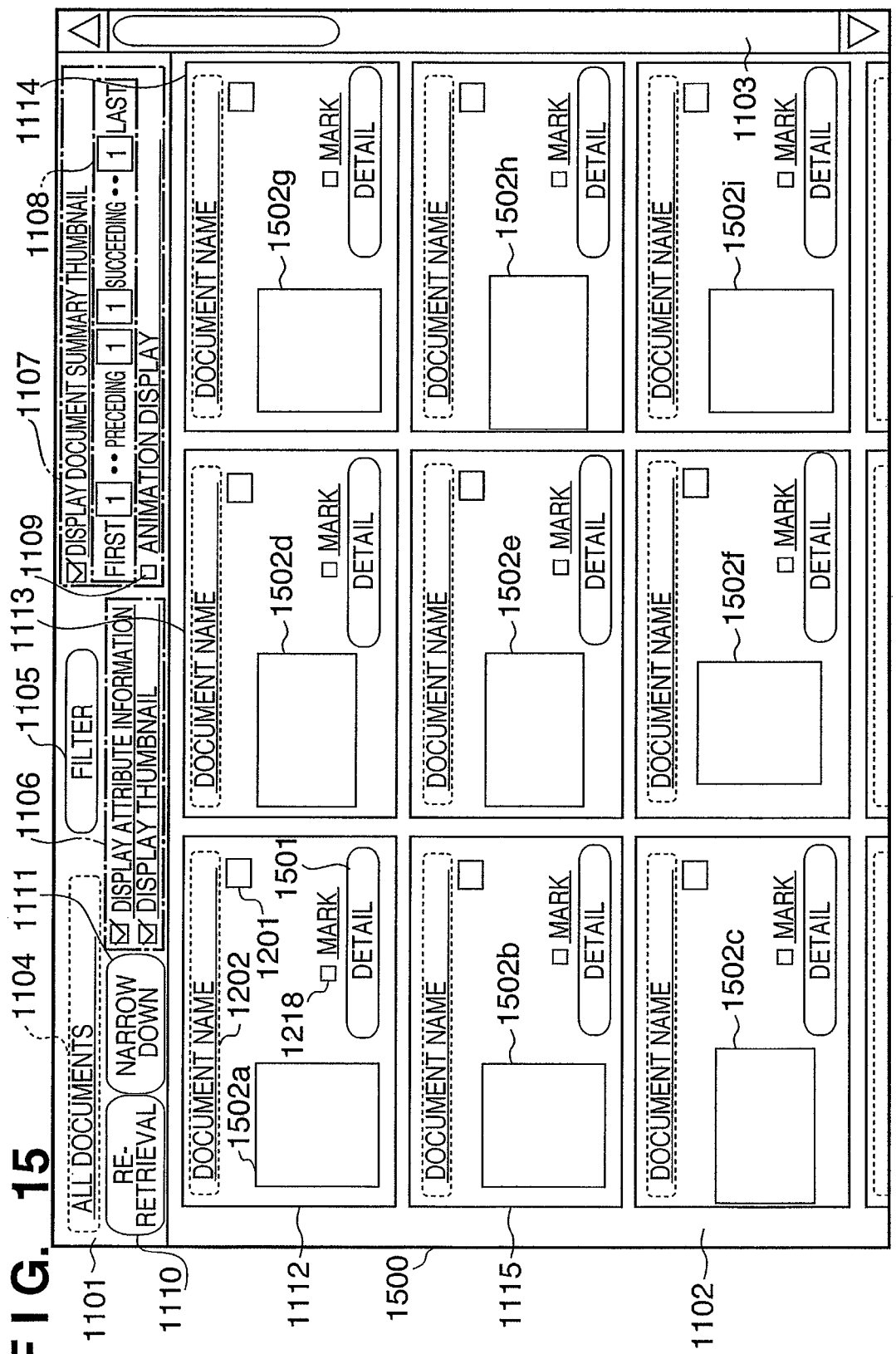

DOCUMENT RETRIEVING APPARATUS, DOCUMENT RETRIEVING METHOD, PROGRAM, AND STORAGE MEDIUM

This application is a continuation of application Ser. No. 11/845,958, filed Aug. 28, 2007 (allowed), the contents of which are incorporated by reference herein.

BACKGROUND OF THE INVENTION

Field of the Invention

The present invention relates to a document retrieving technique.

Description of the Related Art

The advanced storage technology and cost reductions allow storing and managing a large volume of document data. Also, file servers, document management systems, groupware, and the like have prevailed, and have gained in both advanced functions and performance. Information processing apparatuses have made advances, while various video office machines, such as copying machines, printers, image scanners, fax machines, digital cameras, multi-function peripherals (MFPs) that each have document storage and image transmission and reception functions, and the like are compatible with networks. In a network environment, information processing apparatuses and various video office machines constantly exchange a large volume of document data. A storage infrastructure that verifiably stores document traffic that propagates through office networks is beginning to be put into practical use.

Japanese Patent No. 3,486,452 discloses a multi-function image processing apparatus which can connect at least two image data output apparatuses so as to provide a multi-function image processing apparatus which can be guaranteed to make a copy of a required image without troubling an operator.

In order to efficiently retrieve a desired document from a huge number of stored documents, it is important to give consideration also to retrieval of documents that mainly include images, in addition to text. A full-text search does not suffice to retrieve documents that mainly include images in place of text, such as presentation materials, documents that make extensive use of graphics and visual data, and the like. When the user wants to use a given image as a retrieval key, and to retrieve a document including the image, a full-text search alone does not function well.

Many similar image retrieving schemes that retrieve similar images using images as retrieval keys are known. A scheme that extracts an object based on the edges and the like in an image to determine the shape thereof, and uses the allocation, colors, positional relationship among a plurality of objects, and the like thereof, a scheme that extracts and uses a combination or color pattern of dominant colors which form the entire image based on histograms and the like, and so forth are available.

For example, Japanese Patent Application No. 2005-244684 discloses a similar image retrieving scheme that uses mathematical processing which derives feature amounts having characteristics close to cognitive similarity determination.

Japanese Patent No. 3691962 discloses an arrangement which retrieves a document including a plurality of pages based on text, and displays one or a plurality of pages (both pages when text is present across two pages) including a text image corresponding to hit text.

In the document retrieval using the image retrieval technique, it is rather a rare case that only one document is obtained as a retrieval result. In most cases, a process is required that extracts a desired document from a considerable number of hit documents after the retrieval, according to the user's judgment. The reason is that a plurality of documents that include identical images, which are re-used or modified, exist in a large-scale storage infrastructure, for all practical purposes. Also, image similarities are expressed by analog continuous amounts, and even a pair of different images have a certain similarity. A criterion "similar" is arbitrary, since it is based on the subjectivity of the user, according to the end purpose of the retrieval. Since it is impossible to automatically make a similarity evaluation that perfectly fits the subjectivity of the user, the similar image retrieval is used only to narrow down a considerable number of candidates, and an operation for finding out a desired document should be committed to the subjectivity of the user. Furthermore, presenting a considerable number of retrieval result documents with a certain range may stimulate the user's thoughts, and thus, support his or her creative works.

In the document retrieval using the image retrieving technique disclosed in Japanese Patent Application No. 2005-244684, a retrieval result list includes a considerable number of documents and also many noise results (documents other than a desired document). Hence, efficiency is important when the user browses the list and retrieves a desired document from the list.

For example, when a plurality of documents include an image which hits retrieval conditions, they are listed in the document retrieval result list. In such a circumstance, the documents may not be desired, depending on the context wherein the image is allocated. In case of documents mainly including text, a retrieving system which automatically generates summaries using a text summary technique, and displays the summaries of documents in the retrieval result list to allow the user to easily select a desired document, can be constructed. However, image information cannot be expressed by text-based summaries.

Japanese Patent No. 3691962 discloses a display technique when a text-based retrieval result is present across a plurality of pages in a document. However, such a technique does not lead to improvement of the efficiency upon selecting a desired document by the user from the document retrieval result list of the similar image retrieval.

SUMMARY OF THE INVENTION

It is an object of the present invention to provide a document retrieving technique which can efficiently display summaries of documents and the contents in documents where images that hit image retrieval conditions are allocated in a retrieval result list in the document retrieval, using the image retrieving technique.

It is another object of the present invention to provide a document retrieving technique which allows the user to quickly find out a desired document from a retrieval result list including a considerable number of documents and also many noise results.

In order to achieve at least one of the above objects, according to one aspect of the present invention, there is provided a document retrieving apparatus comprising:

a document retrieving unit adapted to retrieve document data which include images that match an input retrieval condition;

a retrieval result list display unit adapted to display, on a display unit, a list display of document data that match the retrieval condition based on retrieval results of the document retrieving unit; and a thumbnail display unit adapted to display, in the list display by the retrieval result list display unit, a first thumbnail image associated with a page or an image element which matches the retrieval condition, and a second thumbnail image associated with another page or another image element which forms the document data that includes the page or the image element which match the retrieval condition.

According to another aspect of the present invention, there is provided a document retrieving method for a document retrieving apparatus which comprises a display unit, comprising:

a document retrieving step of retrieving document data which include images that match an input retrieval condition;

a retrieval result list display step of displaying, on the display unit, a list display of document data that match the retrieval condition based on retrieval results of the document retrieving step; and a thumbnail display step of displaying, in the list display by the retrieval result list display step, a first thumbnail image associated with a page or an image element which matches the retrieval condition, and a second thumbnail image associated with another page or another image element which forms the document data that includes the page or the image element which match the retrieval condition.

According to the present invention, in the document retrieval using the image retrieving technique, summaries of documents and the contexts in documents where images that hit image retrieval conditions are allocated can be efficiently displayed in the retrieval result list.

Also, according to the present invention, the user can quickly find out a desired document from a retrieval result list, including a considerable number of documents and also many noise results.

Further features of the present invention will become apparent from the following description of exemplary embodiments, with reference to the attached drawings.

BRIEF DESCRIPTION OF THE DRAWINGS

FIG. 15 shows a display example of the document retrieval result list window of the document retrieving application in a dense display mode;

DESCRIPTION OF THE EMBODIMENTS

Preferred embodiments of the present invention will be exemplified in detail hereinafter with reference to the accompanying drawings. However, building components described according to the embodiments are merely examples, and the technical scope of the present invention is defined by the scope of claims, but is not limited by the following individual embodiments.

(Arrangement of Image Processing System)

Figure 1:
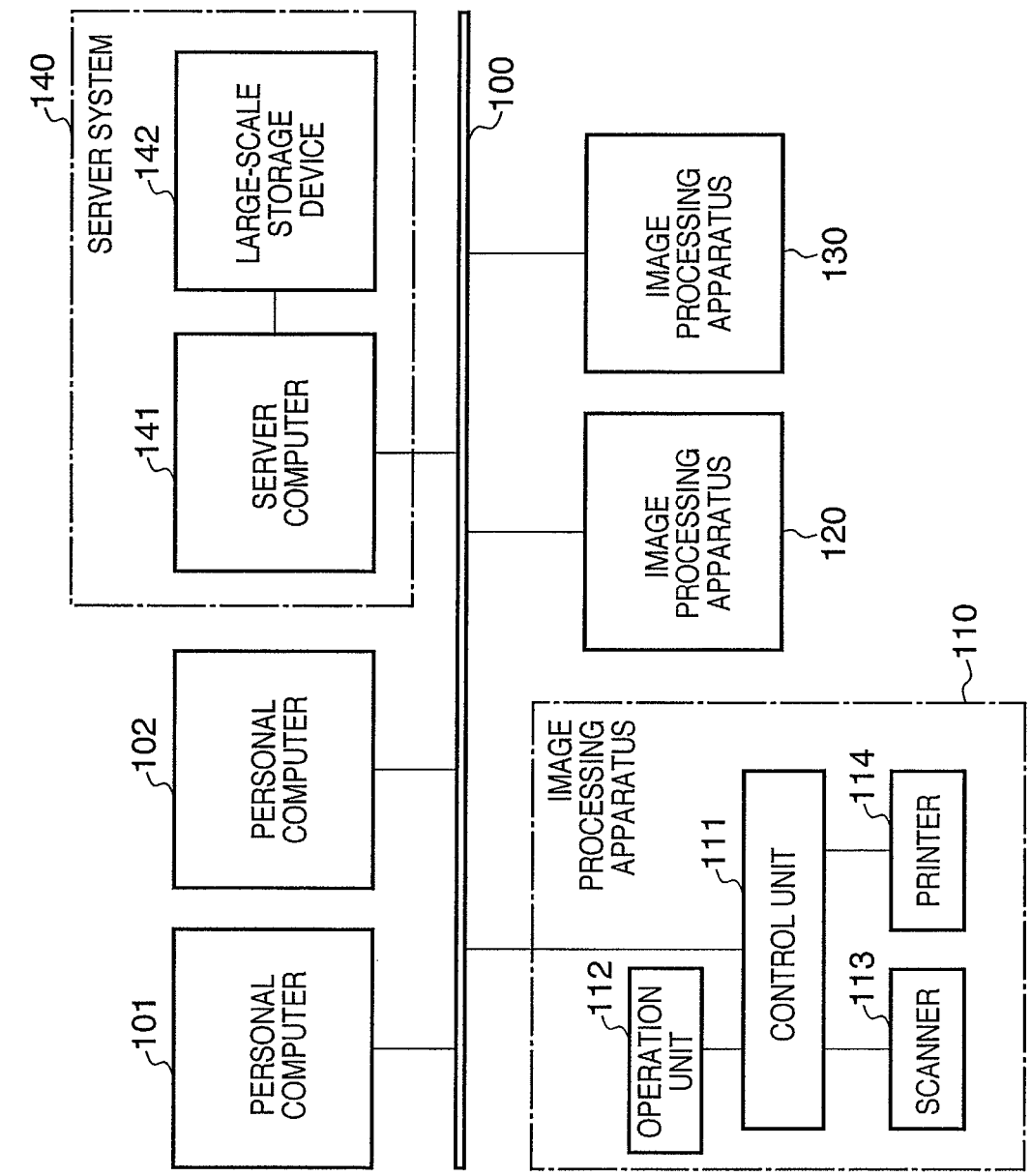
FIG. 1 is a block diagram showing the overall arrangement of an image processing system according to one embodiment of the present invention.

FIG. 1 is a block diagram showing the overall arrangement of an image processing system according to one embodiment. Referring to FIG. 1, the image processing system comprises image processing apparatuses 110, 120, and 130, personal computers (to be also referred to as "information processing apparatuses" hereinafter) 101 and 102, and a server system 140, which are connected to each other via a network. The network comprises, e.g., a LAN (Local Area Network 100.

The image processing apparatus 110 comprises a scanner 113 as an image input device, a printer 114 as an image output device, a control unit 111, and an operation unit 112 as a user interface. The scanner 113, printer 114, and operation unit 112 are connected to the control unit 111, and are controlled by instructions from the control unit 111. The control unit 111 is connected to the LAN 100.

The image processing apparatuses 120 and 130 have the same arrangements as the arrangements of the image processing apparatus 110.

The personal computer 101 is an information processing apparatus which is personally used by each of a plurality of users, and stores application programs used by the user, user data, and the like.

The server system 140 comprises a server computer 141 and a large-scale storage apparatus 142.

The server computer 141 stores server applications which provide services to a plurality of users and client systems, shared data, and the like. The large-scale storage apparatus 142 is a large-scale secondary storage apparatus which has high performance and high reliability, and mainly stores data of a database management system (DBMS) which runs on the server computer 141, and the like.

One of the server applications executed by the server system 140 is a database (DB) applicator which archives (i.e., accumulates and manages) job data (e.g., print data and scan data) which are distributed throughout, the network. The server application will be referred to as a job archive application hereinafter. The job archive application configures a distributed application called a job archive system in collaboration with software installed in other apparatuses connected to the network.

In the system shown in FIG. 1, the personal computer 101 collaborates with the image processing apparatuses 110, 120, and 130, the server system 140, and the like, via the LAN 100. For example, the personal computer 101 exchanges document data (to be also simply referred to as "documents" hereinafter) with the image processing apparatus 110. The personal computer 101 executes jobs such as a print job, scan job, fax send and receive jobs, storage and retrieve jobs to a box (an embedded document management system in the image processing apparatus 110), and the like. Upon execution of a job that processes a document, the job archive application which runs on the server system 140 archives job information and a copy of document data to be processed in the job. For example, in case of a print job, a printer driver on the personal computer 101 inputs a job to the image processing apparatus 110, and also transmits information associated with the job and data of a document to be processed to the server system 140, thus archiving the job.

In the system shown in FIG. 1, the image processing apparatus 110 collaborates with other image processing apparatuses 120 and 130, the personal computers 101 and 102, the server system 140, and the like via the LAN 100. For example, the image processing apparatus 110 can scan an original image to convert it into digital data, and can send the digital data to another apparatus. Also, the image processing apparatus 110 can execute jobs for retrieving data stored in another apparatus, as well as printing the retrieved data, storing it in a local box, or transferring it to still another apparatus.

Upon executing such jobs that process documents, the job archive application which runs on the server system 140 archives job information and a copy of document data to be processed in each job. For example, in case of a push scan job, digital document data obtained by scanning an original document by a "send" application on the image processing apparatus 11 using a scanner is sent to a primary send destination. Simultaneously with sending, information associated with the job (job information) and data of a document to be processed are sent to the server system 140, thus archiving the job.

Hence, the job archive application archives job documents which are distributed throughout the network.

(Software Configuration of Job Archive Application)

Figure 2:
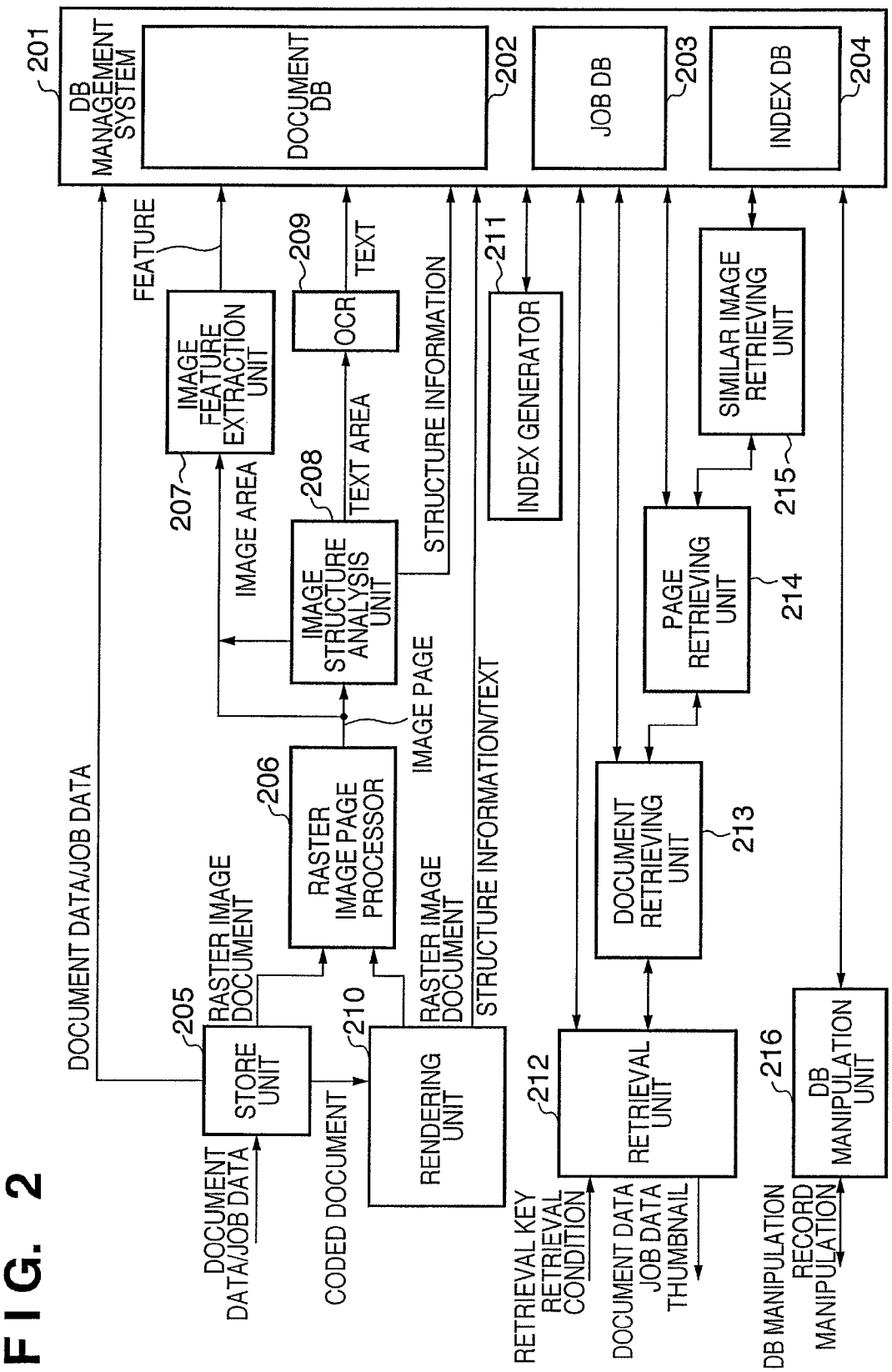
FIG. 2 is a block diagram showing the software configuration of a job archive application which runs on a server system.

FIG. 2 is a block diagram showing the software configuration of the job archive application which runs on the server system 140.

A database management system (DB management system) 201 stores a large volume of data, including a large volume of records as a database structured together with relations among records. The DB management system 201 retrieves records that match input conditions from the database at high speed in response to a query using a query language such as SQL (Structured Query Language) or the like. The DB management system 201 includes a document DB 202, job DB 203, and index DB 204. The DB management system 201 can be implemented by a well-known relational database, object-orientated database, and the like.

The document DB 202 is a database which stores document data which are accumulated and managed by the job archive system. The document DB 202 stores, as document records, the content data of documents and metadata associated with the documents. The document DB 202 and job DB 203 are related to each other among the records stored therein.

The job DB 203 is a database which stores, as job records, job, data which are accumulated and managed by the job archive system. The job DB 203 and document DB 202 are related to each other among the records stored therein.

The index DB 204 is a database which stores index records used to quickly retrieve desired data from document data and job data which are accumulated and managed by the job archive system. The index records stored in the index DB 204 refer to the records in the document DB 202 and job DB 203.

A store unit 205 is a storage request acceptance module which receives document data and job data from a client, such as the image processing apparatus 110, personal computer 101, or the like, and stores the data in the DB management system 201. The store unit 205 stores the received document data and job data in the DB management system 201. The store unit 205 switches processes for generating metadata in correspondence with the data format of the received document data. When the received document data is raster image document data which is generated by scanning an image by an image scanner, capturing an image by a digital camera, or receiving an image via a fax, the store unit 205 sends the document data to a raster image page processor 206.

When the received document data is coded document data, the store unit 205 sends the data to a rendering unit 210. For example, the store unit 205 sends various document formats that are expressed by a page description language or vector data to the rendering unit 210. The store unit 205 sends data of document formats of various applications such as a desktop publishing application, word processor, spreadsheet, presentation application, drawing application, painting application, and the like to the rendering unit 210.

The raster image page processor 206 is a module which divides a raster image document into pages (image pages) which form the document, and processes the divided image pages. The raster image page processor 206 sends the divided image pages to an image feature extraction unit 207 and image structure analysis unit 208.

The image feature extraction unit 207 is a module which analyzes raster image data and extracts feature data (to be also simply referred to as "features" hereinafter) used as criteria upon determining similarities between images. The extracted feature data are sent to the DB management system 201, which stores the received feature data. Various feature extraction schemes are available that are effective for a similar image retrieval. The embodiment does not depend on a specific algorithm, and uses a plurality of effective schemes together. The schemes that can be adopted include the following schemes.

For example, a scheme that extracts an object based on the edges and the like in an image to determine the shape thereof, and uses the allocation, colors, positional relationship among a plurality of objects, and the like thereof, is available. Also, a scheme that extracts and uses a combination or color pattern of dominant colors, which form the entire image based on histograms and the like, is available. Furthermore, a scheme that uses various mathematical processes (e.g., Fourier Mellin Transforms) which derive feature amounts having characteristics close to cognitive similarity determination is available. An approach disclosed by Japanese Patent Laid-Open No. 2006-65866 (Japanese Patent Application No. 2005-244684) is also a suitable scheme.

The image structure analysis unit 208 is a module which analyzes the structure of raster image data. The image structure analysis unit 208 decomposes a group of image areas (image page) into a plurality of areas which form the image page and have different characteristics) using a scheme such as block selection, image area separation, or the like. For example, the image structure analysis unit 208 decomposes an image page into a plurality of areas (text area, image area, photo area, graphics area, black-and-white area, color area, and the like), and analyzes and categorizes the area structures.

Also, the image structure analysis unit 208 analyzes and categorizes layer structures between a background pattern, such as a background or the like, and objects, such as text, a shape, and the like, which are laid out on the background pattern. The image structure analysis unit 208 sends raster image data of the image area (or image layer) obtained as a result of analysis to the image feature extraction unit 207. Also, the image structure analysis unit 208 sends raster image data of the text area (or text layer) obtained as a result of analysis to an OCR unit 209. The image structure analysis unit 208 sends structure information obtained as a result of analysis to the DB management system 201, which stores the received structure information.

The OCR unit 209 is a module which analyzes raster image data on which characters are rendered, and recognizes characters. The OCR unit 209 sends text data (i.e., data coded by Unicode or the like) that have undergone character recognition to the DB management system 201, which stores the received text data.

An index generator 211 is a module which generates index information that is used to quickly retrieve data from the document DB 202 and job DB 203. An index is generated in advance to quickly retrieve document records which include images similar to an image given as a retrieval key or to quickly conduct a full-text retrieval (or search) for document records including text given as a retrieval key in document content data or page content data. Also, an index is pre-generated to quickly retrieve document records or job records having metadata that match conditions that are given as a retrieval key. Index generation can use a plurality of known methods in combination.

Generation of indices for a full-text retrieval uses, e.g., an N-gram scheme. To generate indices for a similar image retrieval, feature vectors that express features of images are clustered in advance or are sorted in a given order using a hash function. Index generation by the index generator 211 is done when the contents of the document DB 202 and the job DB 203 are updated upon additionally registering or editing document data and job data. The index generator 211 can execute index generation as batch processing to be asynchronous with updating of the respective DBs. The generated indices are stored in the index DB 204 of the DB management system 201.

A retrieval unit 212 is a module which accepts a retrieval key (retrieval key image or retrieval key text) and retrieval conditions from a client such as the image processing apparatus 110, the personal computer 101, or the like. The retrieval unit 212 retrieves document data from the DB management system 201 according to the accepted retrieval conditions. The retrieval unit 212 returns hit document data, thumbnail images (to be also simply referred to as "thumbnails" hereinafter) associated with the documents, and metadata such as job data and the like to the client.

A document retrieving unit 213 is a module which retrieves documents which match a document retrieval request. The document retrieving unit 213 can conduct a retrieval based on the content data of a document, which is based on page data included in a document, and which is in turn based on metadata of a document in accordance with the retrieval request and the type of the given retrieval key. The document retrieving unit 213 combines retrievals based on jobs related to a document, and can find out a plurality of document record candidates which match the retrieval request.

A page retrieving unit 214 finds out a plurality of page record candidates which match the conditions of a retrieval request (and documents including the page) from the document DB 202 in response to the retrieval request based on page data included in a document.

A similar image retrieving unit 215 finds out a plurality of page records having page content data including images similar to a retrieval key image (and documents including the page) in response to a similar image retrieval request based on the image given as a retrieval key. The similar image retrieving unit 215 applies the same image feature extraction as in the image feature extraction unit 207 to a retrieval key image, and retrieves similar images based on similarities of respective features.

A DB manipulation unit 216 is a database manipulation module which accepts and processes a manipulation to the databases and a manipulation request for records in the respective databases from a client, and returns results to the client. The client includes a management console of the server computer 141, the image processing apparatus 110, the personal computer 101, and the like. The manipulation for records includes a manipulation such as addition, editing, and the like of metadata (e.g., tags and the like).

(Hardware Arrangement of Image Processing Apparatus)

Figure 3:
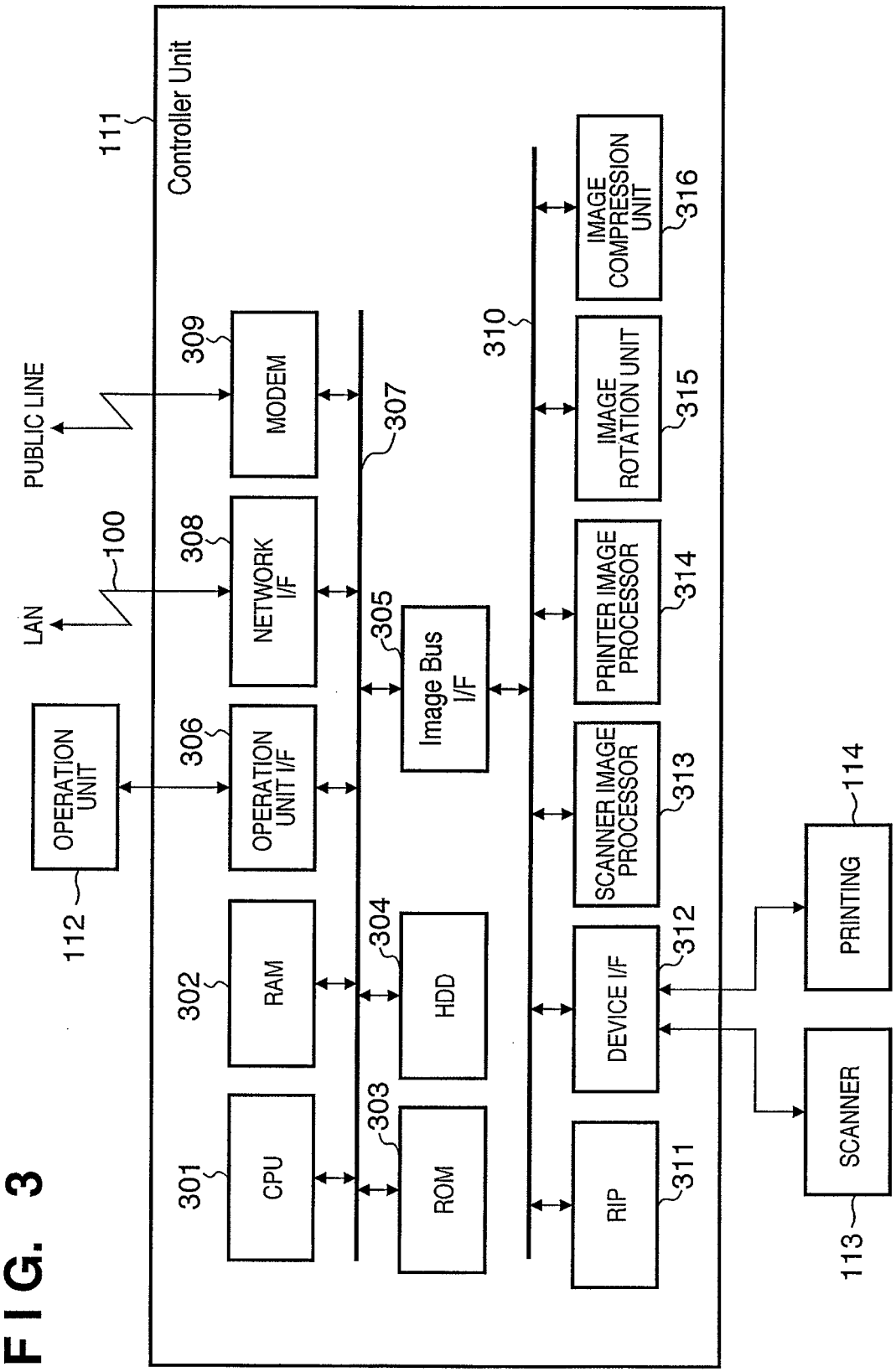
FIG. 3 is a block diagram showing the hardware arrangement of an image processing apparatus.

FIG. 3 is a block diagram showing the hardware arrangement of the image processing apparatus 110. The image processing apparatuses 120 and 130 also comprise the same arrangements.

The control unit 111 is connected to the scanner 113 and printer 114, and also to the LAN 100 and a public line (WAN), so as to control input and output of image information and device information.

A CPU 301 controls the operation of the control unit 111. A RAM 302 is a system work memory used by the CPU 301 for the operation thereof. The RAM 302 is also an image memory used to temporarily store image data. A ROM 303 is a boot ROM which stores a boot program of the system. An HDD 304 is a hard disk drive, which stores system software and image data.

An operation unit interface (I/F) 306 controls an interface with the operation unit (UI) 112, and outputs image data to be displayed on the operation unit 112 to it. Also, the operation unit I/F 306 plays a role of notifying the CPU 301 of information which is input by the user via the operation unit 112.

A network interface (I/F) 308 controls a connection with the LAN 100, and serves as a communication unit that inputs and outputs information to and from the LAN 100. A modem 309 controls a connection with the public line, and serves as a communication unit that inputs and outputs information to and from the public line. The aforementioned devices are allocated on a system bus 307.

An image bus interface (Image Bus I/F) 305 is a bus bridge, which connects the system bus 307 and an image bus 310 which transfers image data at high speed, and converts a data structure. The image bus 310 comprises a PCI bus or IEEE1394.

On the image bus 310, the following devices are allocated. A raster image processor (RIP) 311 rasterizes PDL code data sent from the network into a bitmap image. A device interface (I/F) 312 connects the scanner 113 and printer 114 as the image input and output devices to the control unit 111, and performs conversion between a synchronous system and an asynchronous system of image data. A scanner image processor 313 corrects, modifies, and edits input image data. A printer image processor 314 performs correction, resolution conversion, and the like according to the performance of the printer 114 to print output image data. An image rotation unit 315 rotates image data. An image compression unit 316 applies JPEG compression/decompression processing upon multi-valued image data, and compression and decompression processing of JBIG, MMR, or MH to binary image data.

(Outer Appearance of Image Processing Apparatus)

Figure 4:
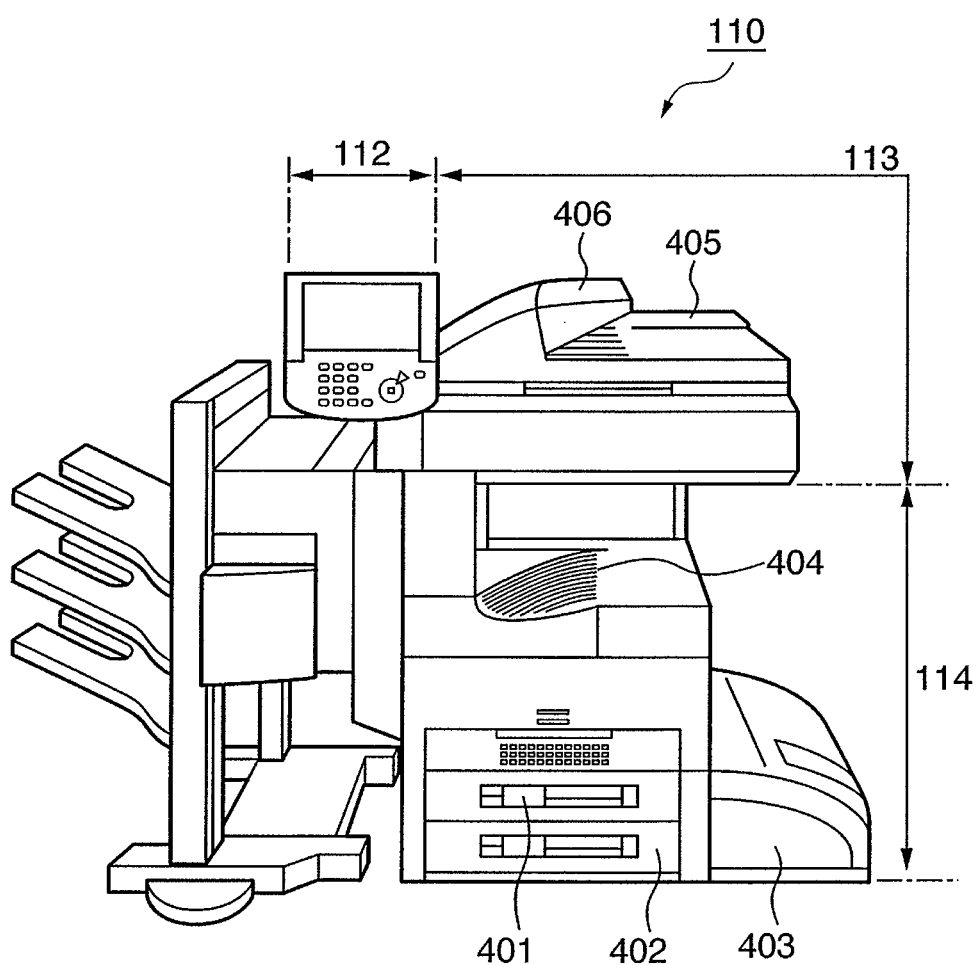
FIG. 4 is a perspective view showing an outer appearance of the image processing apparatus.

FIG. 4 is a perspective view showing an outer appearance of the image processing apparatus 110. The image processing apparatuses 120 and 130 also have the same outer appearances. Note that, while the following description will be given about the image processing apparatus 110, the image processing apparatuses 120 and 130 also comprise the same arrangements, and can execute the same operations.

The scanner 113 as the image input device generates raster image data by illuminating an image on a print medium (paper sheet) as an original with light, and scanning a CCD line sensor (not shown).

When the user places original sheets in a tray 406 of a document feeder 405, and inputs a scan activate instruction at the operation unit 112, the CPU 301 of the control unit 111 sends the instruction to the scanner 13. Based on the input instruction, the original sheets that are placed on the tray 406 are fed one by one, and the scanner 113 scans original images.

The printer 114 as the image output device prints and outputs raster image data on a print medium (paper sheet). As print systems, an electrophotography system that uses a photosensitive drum, photosensitive belt, or the like, an ink-jet system which ejects ink from a micro-nozzle array to directly form an image on a print medium (paper sheet), and the like are available, and any such system may be adopted. Note that the print operation is activated in response to an instruction from the CPU 301.

The printer 114 has a plurality of paper feed decks to allow the user to select different paper sizes or different paper orientations, and comprises corresponding paper cassettes 401, 402, and 403. An exhaust tray 404 receives printed paper sheets.

(Operation Unit of Image Processing Apparatus)

Figure 5:
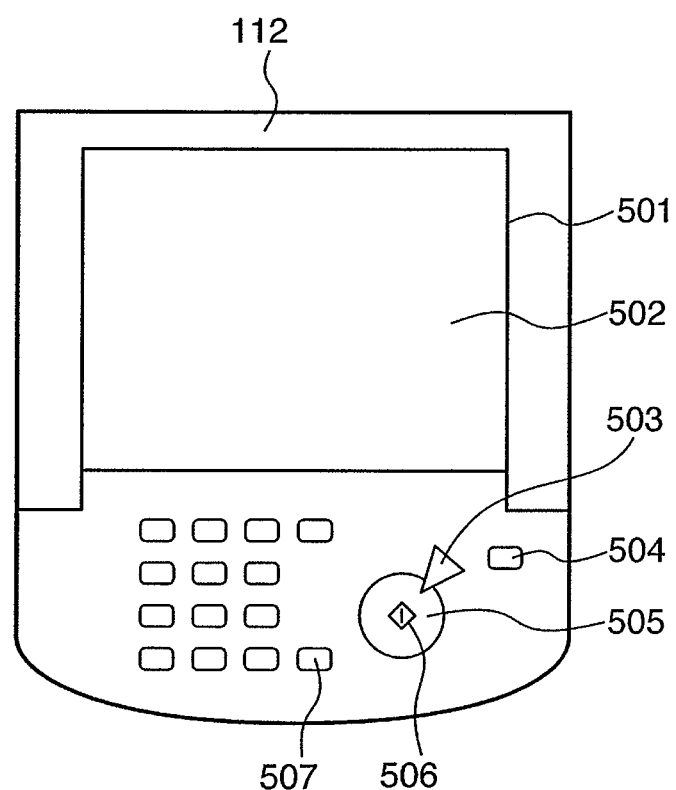
FIG. 5 shows the arrangement of an operation unit of the image processing apparatus.

FIG. 5 is a plan view showing the arrangement of the operation unit 112 of the image processing apparatus 110. Note that the operation units of the image processing apparatuses 120 and 130 comprise equivalent arrangements.

An LCD display unit 501 is configured by adhering a touch panel sheet to a touch panel display 502 on a liquid crystal display (LCD). The LCD display unit 501 displays an operation window and software keys of the image processing apparatus 110, and when the user presses one of the displayed keys, the unit 501 sends position information indicating the pressed position to the CPU 301 of the control unit 111.

A start key 505 is pressed when the user wants to start, e.g., the scan operation of an original image. A central portion of the start key 505 includes a green-red, two-color LED indicator 506, which indicates whether or not the start key 505 is ready to operate. A stop key 503 is pressed when the user wants to stop the active operation of the image processing apparatus 110. An ID key 507 is pressed when the user inputs his or her user ID. A reset key 504 allows the user to reset the settings from the operation unit 112.

(Internal Arrangements of Operation Unit and Operation Unit Interface (I/F))

Figure 6:
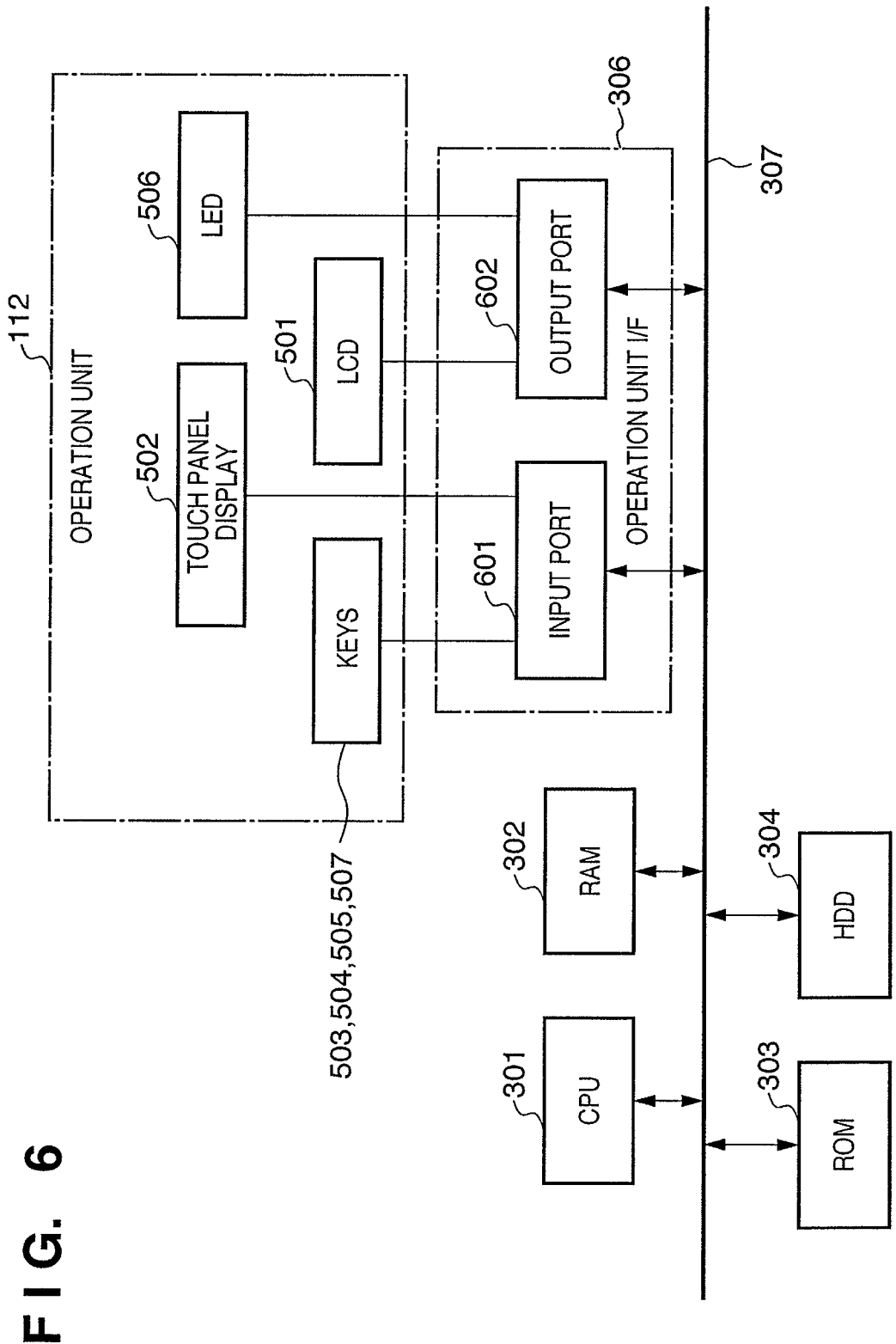
FIG. 6 is a block diagram showing the internal arrangements of the operation unit and an operation unit interface (I/F) of the image processing apparatus in correspondence with that of a control unit.

FIG. 6 is a block diagram showing the internal arrangements of the operation unit 112 and operation unit I/F 306 of the image processing apparatus 110 in correspondence with that of the control unit 111. Note that, while the following description will be given about the image processing apparatus 110, no problem is posed even when the image processing apparatus 110 is replaced by the image processing apparatus 120 or 130.

As described above, the operation unit 112 is connected to the system bus 307 via the operation unit I/F 306. To the system bus 307, the CPU 301, RAM 302, ROM 303, and hard disk drive (HDD) 304 are connected. The CPU 301 systematically controls access to various devices connected to the system bus 307, based on control programs and the like stored in the ROM 303 and HOD 304. The CPU 301 reads input information from the scanner 113, which is connected via the device I/F 312, and outputs an image signal as output information to the printer 114, which is connected via the device I/F 312. The RAM 302 serves as a main memory, work area, and the like of the CPU 301.

User input information from each of the touch panel of the touch panel display 502 and various hardware keys (stop key 503, reset key 504, start key 505, and ID key 507) is passed to the CPU 301 via an input port 601. The CPU 301 generates display window data based on the contents of the user input information and control programs and outputs the display window data to the LCD display unit 501 via an output port 602 which controls a window output device. Also, the CPU 301 controls the two-color LED indicator 506 as needed.

Figure 7:
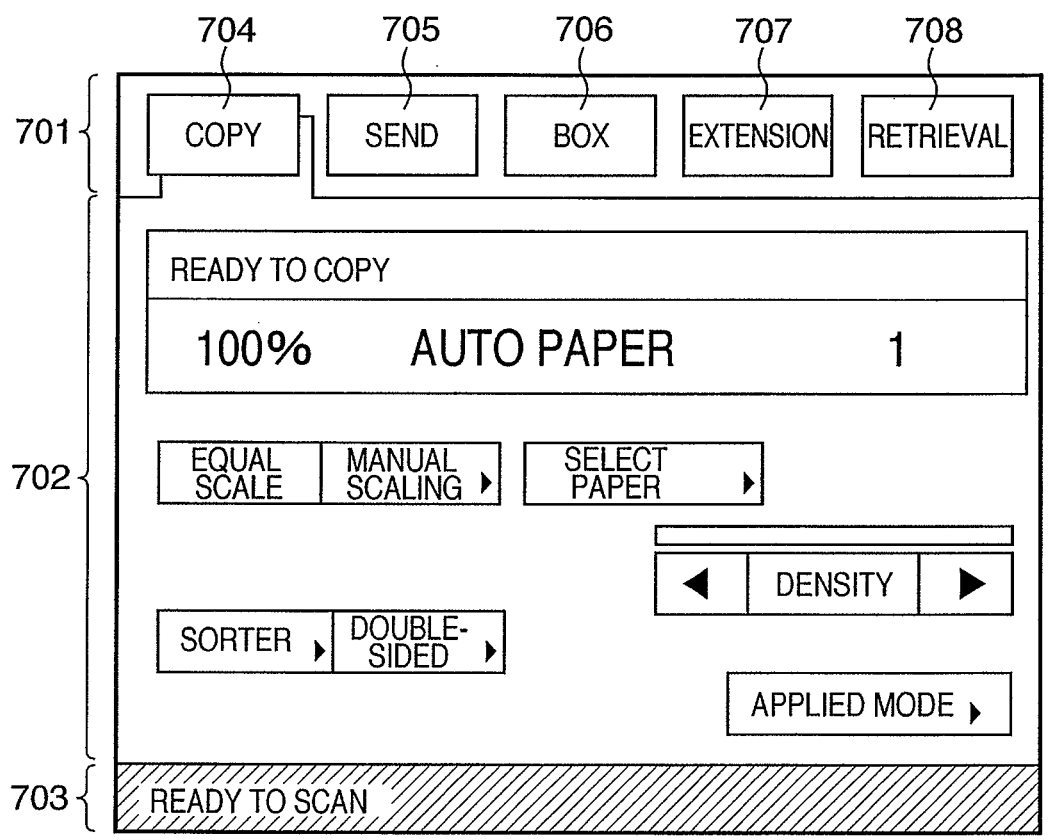
FIG. 7 shows an example of an operation window displayed on the operation unit of the image processing apparatus.

FIG. 7 shows an example of a standard operation window displayed on the operation unit 112 of the image processing apparatus 110.

Buttons arranged on an uppermost display area 701 of FIG. 7 are used to select one of various functions provided by the image processing apparatus 110. A copy function 704 allows the user to print, using the printer 114, original image data obtained by scanning an original image by the scanner 113 so as to obtain a copy of the original image.

A send function 705 allows the user to send original image data scanned by the scanner 113 or image data stored in the HDD 304 to various output destinations. The output destinations include various output destinations to which data can be sent by various protocols via the network interface 308, and output destinations to which data can be sent by, e.g., protocols such as FAX and the like, via the modem 309. With the send function 705, data can be sent by selecting a plurality of output destinations.

A box function 706 allows the user to browse, edit, print, and send document files such as image data, code data, and the like stored in the HDD 304. Document files stored in the HDD 304 include original image data scanned by the scanner 113, and data downloaded via the network interface 308. Also, document files stored in the HDD 304 include data obtained by storing print data received from another apparatus via the network interface 308, fax data received from another apparatus via the modem 309, and the like.

The box function 706 can be used as an e-mail box in a user's office environment. The box function 706 can also be used as a secured print function which enhances the confidentiality of PDL print jobs, since the printout operation onto paper sheets is postponed until the user inputs a password.

Using the box function 706 allows the user to access the HDDs of other image processing apparatuses 120 and 130 and shared file systems disclosed by the information processing apparatuses 101 and 102 to browse, edit, print, and send data. With the box function 706, the user can access document files such as image data, code data, and the like that are stored in a shared file system, database systems, and the like of the server system 140, and can browse, edit, print, and send data.

An extension function 707 allows the user to call various extension functions to use the scanner 113 from an external apparatus.

A retrieval function 708 allows the user to retrieve a desired document from the box of the image processing apparatus 110, the boxes of other image processing apparatuses, and the like. With the retrieval function 708, the user can retrieve a desired document from the shared file systems disclosed by the information processing apparatuses, and the shared file system and database systems provided by the server system 140.

A middle display area 702 in FIG. 7 displays an operation window when the user selects the copy function 704. A lowermost display area 703 in FIG. 7 corresponds to a status display area, which displays various messages such as the functions of the image processing apparatus 110, information of the apparatus itself, and the like to the user, irrespective of the function selected on the uppermost display area 701.

Figure 8:
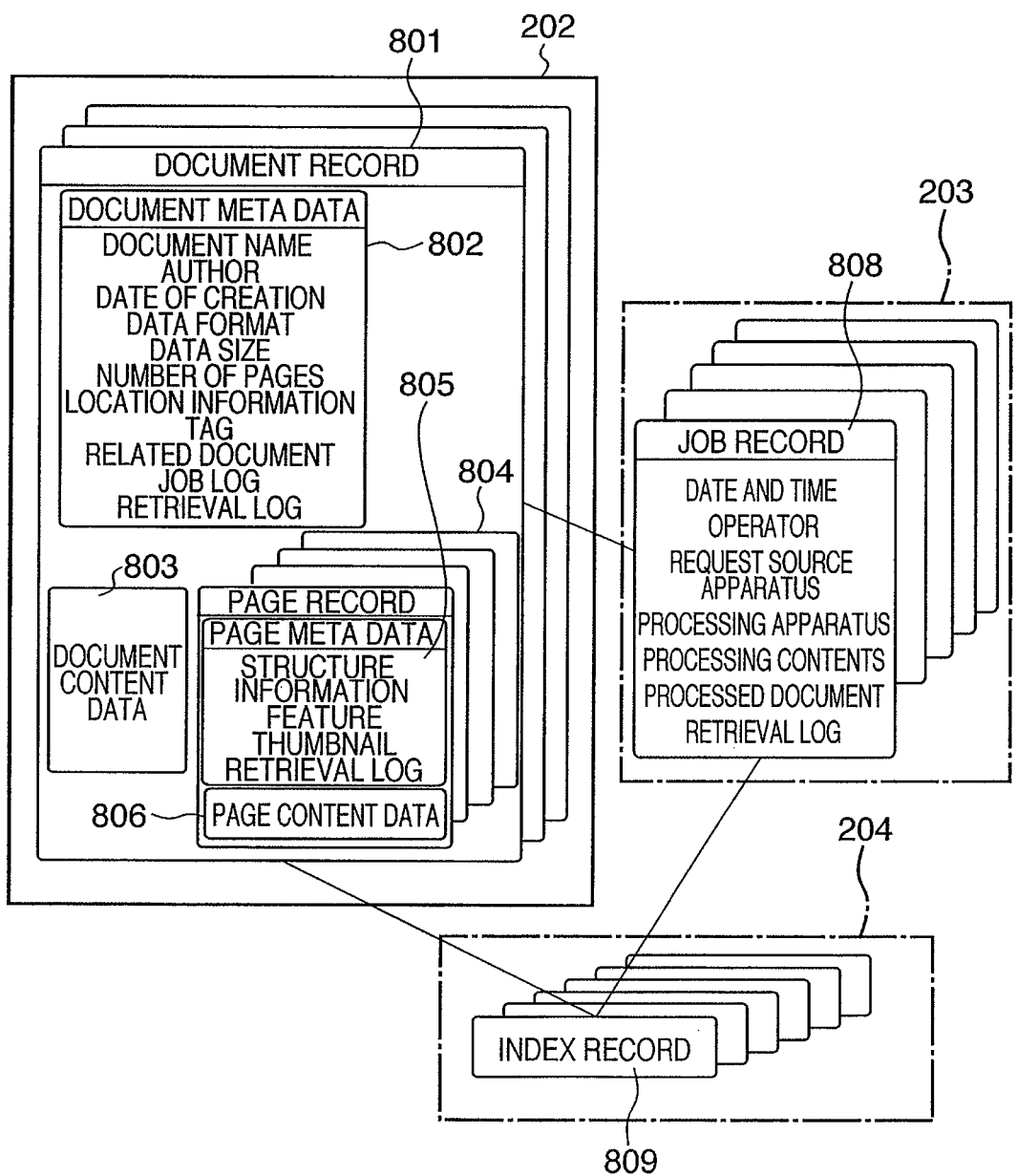
FIG. 8 shows the data structures of databases stored in a database (DB) management system.

FIG. 8 shows the schematic configurations of the respective databases stored in the DB management system 201.

The document DB 202 includes a plurality of document records 801. The document records 801 correspond to paper documents and digital document files to be handled by the user. Each document record 801 includes document metadata 802, document content data 803, and a plurality of page records 804.

The document metadata 802 is a record that stores various metadata associated with a document corresponding to the document record. The document metadata 802 includes a document name, author, date of creation, data format, data size, the number of pages, tags, job log, and the like.

A "tag" is information like a keyword formed by an arbitrary character string that the user assigns to the document. A document can be retrieved based on the tag. The user can freely assign a plurality of tags to one document. By appending tags to documents, documents can be categorized based on various criteria and can be easily retrieved. To a shared document, a plurality of users can add tags later so as to refer to or use that document at a later time. Accordingly, metadata used to categorize and retrieve documents can be dramatically made more satisfactory.

The approach is often called "folksonomy". "Folksonomy" is a term that combines "folks" and "taxonomy".

The job log is a list of reference information used to specify a series of jobs executed for documents as objects to be processed. One document record often holds references to a plurality of job records. For example, consider a circumstance wherein a plurality of jobs use, as objects to be processed, documents which are apparently specified as an identical document.

The document content data 803 is data corresponding to the contents of a document itself. The document content data 803 corresponds to text, data of an application program, and the like when coded document data is stored. When pages which form a document are clearly separated like raster image data which correspond to paper originals and are scanned by the scanner, each page record 804 includes the content data.

The page record 804 is a record which corresponds to each of pages which form a document. The individual page records 804 correspond to a raster image data group scanned by the scanner 113, image data obtained by rendering data of an application program by the rendering unit 210 and dividing it into pages, structure information, text, a metadata group, and the like.

Each page record includes page metadata 805 and page content data 806. The page metadata 805 is a record that stores various metadata associated with the corresponding page. The page metadata 805 includes structure information, features, thumbnails, and the like. The structure information is information associated with the structure of that page which is stored as a result of analysis by the image structure analysis unit 208 or the rendering unit 210.

The features are information that expresses the features of images which are extracted and stored by the image feature extraction unit 207 and form a page.

The thumbnails are images of several relatively small sizes which are easy to handle, and are obtained by applying resolution conversion (or downscaling) to an image of the entire page or image elements included in that page. The thumbnail images may be generated upon generation of the page metadata 805 or may be generated on-demand if they are required to respond to an external retrieval request. Also, a task which generates thumbnail images, which are not generated yet, together by scheduled batch processing may be asynchronously executed.

The page content data 806 is data corresponding to the contents of a page itself. The page content data 806 stores image data for each page such as raster image data obtained by scanning a page of a paper original by the image scanner, image data obtained by rendering a code document into pages by the rendering unit 210, and the like. Also, the page content data 806 stores text data obtained by applying character recognition to a page image by the OCR 209, text information for each page obtained by rendering a code document by the rendering unit 210, and the like.

The job DB 203 includes a plurality of job records 808. The job record 808 is a record corresponding to each respective document processing job that is executed by the user. Each job record 808 includes a date and time, operator, request source apparatus, processing apparatus, processing contents, processed document, and the like. The date and time are data which express the date and time of execution of the corresponding job. The operator is data which specifies the user who executed the job.

The processing request source apparatus is an apparatus which serves as a source of the job execution request. For example, when the personal computer 101 sends a print job to the image processing apparatus 110, the request source apparatus is the personal computer 101.

The processing apparatus is an apparatus which practically processes a job. For example, when the personal computer 101 sends a print job to the image processing apparatus 110, the processing apparatus is the image processing apparatus 110.

The processing content is information that specifies the processing content of a job. The processing content include a job type, and information that specifies how to select and set various selectable options and various settable parameters in each job type upon processing.

The processed document is a list of reference information that specifies documents as objects to be processed of the job. One job record often refers to a plurality of document records. For example, consider a circumstance wherein one job is executed to have a plurality of documents as objects to be processed.

The index DB 204 includes a plurality of index records 809. Each index record 809 is index information used to quickly retrieve data from the document DB 202 and job DB 203, and refers to a plurality of document records 801 and a plurality of job records 808.

The index records are generated by the index generator 211. The index records can be used to quickly retrieve document records which include images similar to an image that is given as a retrieval key. Also, the index records can be used to quickly retrieve document records which include text given as a retrieval key in the document content data and page content data. Furthermore, the index records can be used to quickly retrieve document records and job records having metadata that match conditions that are given as a retrieval key.

(Sequence of Retrieval Processing)

Figure 9:
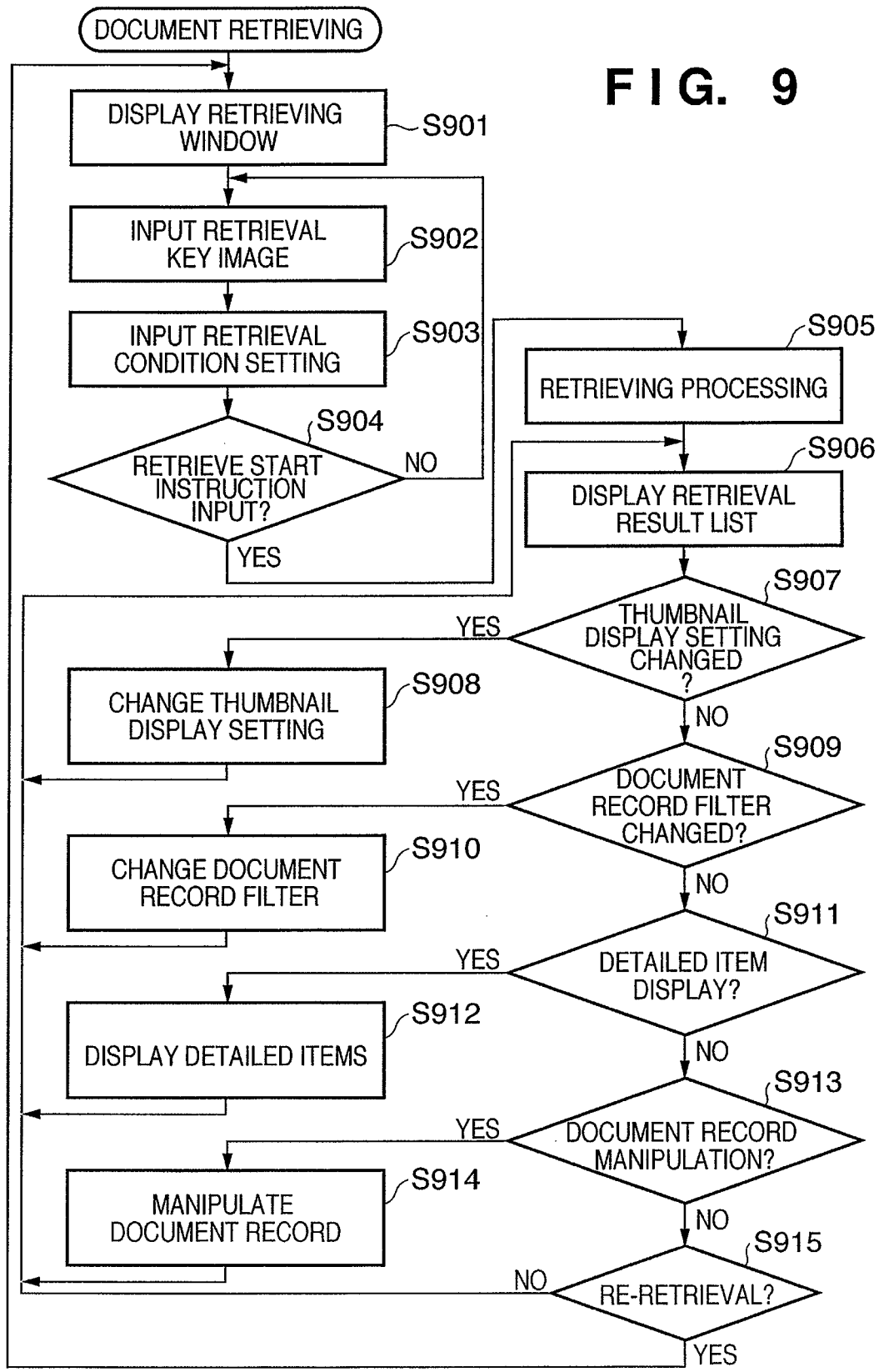
FIG. 9 is a flowchart for explaining the sequence of retrieval processing.

FIG. 9 is a flowchart for explaining the sequence of retrieval processing. The retrieval processing is implemented by an embedded application program executed by the CPU 301 of the image processing apparatus 110. The embedded application is called a document retrieval application.

A series of sequences of the flowchart starts when the user selects, e.g., the "retrieve" button in the display area 701 on the operation unit 112.

In step S901, the document retrieving application displays a basic window (retrieval window) of the document retrieval function on the display area 702 of the operation unit 112. The retrieval window allows the user to set retrieval conditions, input a retrieval key, input a start retrieval instruction, and so forth. The configuration of the retrieval window will be described later using FIG. 10.

In step S902, the application inputs a retrieval key image according to the user's instruction.

In step S903, the application inputs other retrieval condition settings according to the user's instruction.

In step S904, the application waits for input of a start retrieval instruction from the user. Before the user inputs the start retrieval instruction (NO in S904), the process returns to step S902 to repeat input of a retrieval key image and other retrieval condition settings. If the user inputs the start retrieval instruction (YES in S904), the process advances to step S905.

In step S905, the application executes retrieval processing. The document retrieval application establishes a connection to the job archive application which runs on the server system 140, and sends the retrieval key and retrieval conditions to the retrieval unit 212. The application receives data required to display a retrieval result list in association with one or more documents which match (hit) the retrieval conditions as a result of retrieval by the retrieval unit 212. A considerable number of documents hit the retrieval conditions in terms of the features of similar image retrieval and a full-text retrieval. Data required to display the retrieval result display are metadata included in document records corresponding to the hit documents and some of the data included in job records associated with the document records.

In step S906, the application displays the retrieval result list based on the information received from the job archive application. The configuration of the retrieval result list will be described hereinafter, with reference to FIG. 11.

The application checks in step S907 if the user inputs a thumbnail display setting change instruction. If the user inputs the instruction (YES in S907), the process advances to step S908 to change the thumbnail display setting. The process returns to step S906. In step S906, the application re-displays the retrieval result list based on the changed thumbnail display setting.

If the application determines in step S907 that the user does not input any thumbnail display setting change instruction (NO in S907), the process advances to step S909.

The application checks in step S909 if the user inputs a document record filter change instruction. If the user inputs that instruction (YES in S909), the process advances to step S910 to change a document record filter. The process then returns to step S906 to re-display the retrieve result list based on the changed document record filter.

If the application determines in step S909 that the user does not input any document record filter change instruction (NO in S909), the process advances to step S911.

The application checks in step S911 if the user inputs a detailed item display instruction of a document or page. If the user inputs the instruction (YES in S911), the process advances to step S912 to display a window that displays detailed information associated with the selected document, page, or job. After the user closes the detailed item display window, the process returns to step S906 to re-display the retrieval result list.

If the application determines in step S911 that the user does not input any detailed item display instruction (NO in S911), the process advances to step S913.

The application checks in step S913 if the user inputs a manipulation instruction to a document record. Manipulations allowed to document records displayed in the list include printing, saving, sending, appending of a tag, retrieval and display of related documents, marking, and the like. If the user inputs the instruction (YES in S913), the process advances to step S914 to execute a document record manipulation corresponding to the selected instruction. The process returns to step S906 to re-display the retrieval result list.

If the application determines in step S915 that the user does not input any document manipulation instruction (NO in S913), the process advances to step S915.

The application checks in step S915 if the user inputs a re-retrieve instruction. If the user does not input any re-retrieve instruction (NO in S915), the process returns to step S906 to re-display the retrieval result list. If the application determines in step S915 that the user inputs the re-retrieve instruction (YES in S915), the process returns to step S901 to execute a series of retrieval processes once more.

Note that the information processing apparatus 101 may execute a series of processes of the sequence. Alternatively, a series of processes may be divided, and software programs which execute respective processes may be installed on and executed by a plurality of apparatuses to configure a distributed application. For example, display of the retrieving window and retrieve result list and instruction inputs from the user may be executed on the image processing apparatus 110. Then, other processes may be executed on the information processing apparatus 101, server system 140, other image processing apparatuses 120 and 130, and the like.

Conversely, display of the retrieval window and the retrieval result list and instruction inputs from the user may be executed on the information processing apparatus 101, and other processes may be executed on the image processing apparatus 110 and server system 140. When the user manipulates the document retrieval application on the information processing apparatus 101, it may become inconvenient for the user to input an image on a paper original as a retrieval key image rather than the manipulation on the image processing apparatus 110 which comprises the scanner 113. In such a circumstance, since the user can manipulate an image stored by the box function of the image processing apparatus 110 in advance from the information processing apparatus 101, another image processing apparatus 120, or the like, it is easy for the user to use the image selected from the box as a retrieval key image.

As one of methods of configuring the distributed application, the form of a Web-based application implemented by a combination of Web browsers and Web servers is available.

(Configuration Example of Document Retrieving Window)

Figure 10:
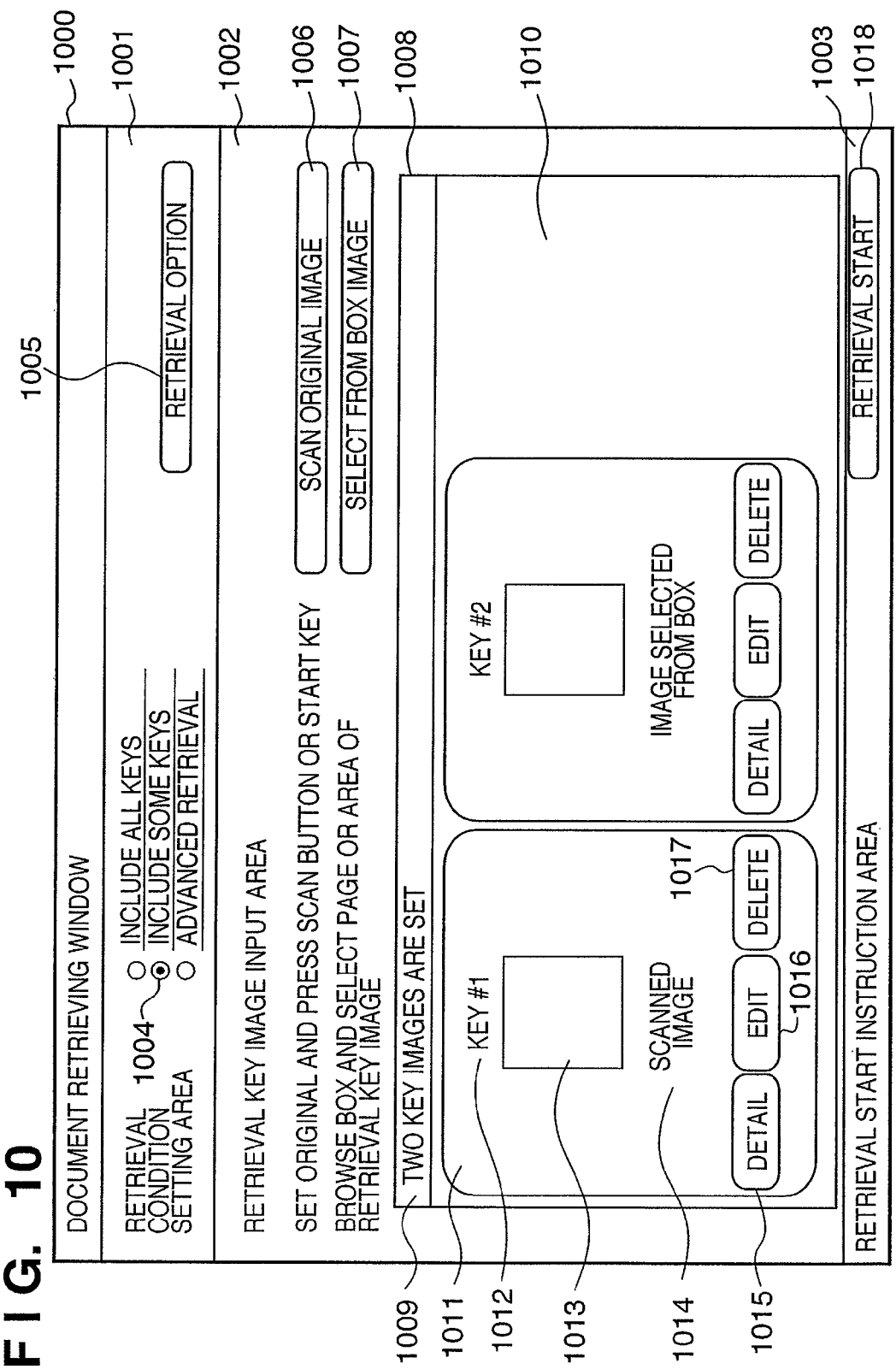
FIG. 10 shows a configuration example of a document retrieval window as a basic window of a document retrieval application.

FIG. 10 shows an example of the configuration of the document retrieval window as the basic window of the document retrieval application. A document retrieving window 1000 is used as the basic window of the document retrieving application. The document retrieving application in this embodiment displays the document retrieving window on the display area 702 of the operation unit 112. The document retrieving window 1000 includes a retrieval condition setting area 1001, a retrieval key image input area 1002, and a retrieval start instruction area 1003.

The retrieval condition setting area 1001 allows the user to set and confirm the retrieval conditions.

Retrieval condition radio buttons 1004 allow the user to select a basic retrieval condition and to confirm the selected setting. An option "including all keys" indicates retrieval of documents that hit all of the set retrieval keys. An option "including some keys" indicates retrieval of documents that hit some of the set retrieval keys. An option "advanced retrieval" indicates retrieval of documents that hit the detailed retrieval condition that is set upon pressing of a retrieval option button 1005.

The retrieval option button 1005 allows the user to open a window used to set detailed retrieval conditions. The detailed retrieval condition setting includes advanced retrieval condition settings used as criteria for determining hit documents upon execution of retrieval in an advanced retrieval mode. As an option of the detailed retrieval condition, a condition that uses a metadata retrieval and a full-text retrieval together can be set to be used together with a similar image retrieval.

The metadata retrieval is a retrieval method which designates retrieval conditions for respective data items stored in document metadata, a group of page metadata 805, and a corresponding job record 808 in association with a document record 801 corresponding to a given document. The metadata retrieval allows designating retrieval conditions based on the tags, document name, owner, date of creation, data format, number of pages, tags, related documents, and the like. The metadata retrieval allows designating retrieval conditions based on the job log (date and time, operator, request apparatus, processing apparatus, processing contents, and other documents to be processed, which were processed by the job), structure information of respective pages, and the like.

Therefore, in addition to a general retrieval based on the document name, owner, date and time of creation, tags, and the like, documents can be retrieved based on the related documents and the log of the previous retrieval of the document.

The metadata retrieval allows retrieving documents based on other criteria such as the orientation of pages that form a document, i.e., portrait (vertically elongated) or landscape (horizontally elongated), and the like. Also, the metadata retrieval allows retrieving documents based on other criteria such as the paper size, the page range (n pages≤the number of pages<m pages), color or monochrome, the ratio of images and text, and the like.

Furthermore, the metadata retrieval allows retrieving documents based on other criteria associated with jobs, i.e., when, where, by whom, and how the document was processed.

The full-text retrieval sets text (character string) as a retrieval key, and retrieves documents including the set character string in the full text. Text of a document is included in the document content data 803 included in the document record 801, and the page content data included in any of the page records 804.

Text data included in the document metadata 802 or page metadata 805 can be added as a full-text retrieval target. Also, the following setting may be adopted. When text data included in the job record 808 related to a document is added as a full-text retrieval target and job records 808 hit, corresponding document records 801 may hit.

The retrieval key image input area 1002 allows the user to set and confirm an image to be used as a retrieval key of the similar image retrieval.

An original image scan button 1006 allows the user to scan a paper document using the scanner 113 of the image processing apparatus, and to input the scanned image as a retrieval key of the similar image retrieval. Upon pressing the original image scan button 1006, an image scan window is opened. The image scan window allows the user to make original scan settings in the copy or send function of the image processing apparatus 110, the functions of a general scanner device driver based on TWAIN or the like, and so forth, and to set original scan parameters.

Upon pressing the start key 505, an original image is scanned according to the set original scan parameters, and the scanned image data is input as a retrieval key image. Upon completion of scanning of the original image, the image scan window is closed if it is open. Upon pressing the start key 505 without pressing the original image scan button 1006, an original image is scanned according to default original scan parameters or the scan parameters which are set so far.

A box image select button 1007 allows the user to select a retrieval key image from pre-stored documents using the box function of the image processing apparatus 110. The box function allows the user to browse the contents of the HDD 304 of the image processing apparatus 110 and to select a document including an image that he or she wants to use as a retrieval key image.

Also, the user can select a document including an image that he or she wants to use as a retrieval key image by accessing and browsing the content of the HDDs of other image processing apparatuses 120 and 130 or the shared file systems disclosed by the information processing apparatuses 101 and 102 via the LAN 100. Alternatively, the user can select a document including an image that he or she wants to use as a retrieval key image by accessing and browsing document files of the shared file system, database systems, and the like provided by the server system 140.

A retrieval key image setting area 1008 allows the user to confirm and manipulate set retrieval key images.

A retrieval key image setting condition message 1009 indicates the setting condition of retrieval key images, and displays the number of set retrieval key images, and the like.

A retrieval key image display area 1010 displays a set retrieval key image group. This area displays a set of juxtaposed retrieval key icons corresponding to images set as retrieval keys. When the user inputs a retrieval key image using the original image scan button 1006 or box image select button 1007, a corresponding retrieval key icon is added thereto.

A retrieval key icon 1011 corresponds to one retrieval key image. The user can input various instructions to a retrieval key image thereby.

A retrieval key ID 1012 is identification information (identifier) used to specify a retrieval key image.

A retrieval key thumbnail 1013 is a thumbnail image of the retrieval key image. Upon pressing the retrieval key thumbnail 1013, an image viewer window is opened and displays the retrieval key image at a size larger than the thumbnail. With the image viewer window, the user can confirm details of the retrieval key image.

A retrieval key summary 1014 is a brief description of the retrieval key image.

A retrieval key detail button 1015 allows the user to confirm detailed information about a retrieval key image. Upon operation of the retrieval key detail button 1015, a retrieval key detail window that displays information about the retrieval key in more detail than the retrieval key summary 1014 can be opened. The retrieval key detail window also allows the user to set retrieval conditions unique to the retrieval key image. In order to reuse the retrieval key in future retrievals, the user can save the retrieval key image in the box.

A retrieval key edit button 1016 allows the user to edit a retrieval key image. Upon operation of the retrieval key edit button 1016, a retrieval key edit window, which is used to edit the retrieval key image, can be opened. The retrieval key edit window allows the user to obtain a desired edited retrieval key image by applying various image processes such as trimming, masking, noise removal, and the like to a retrieval key image. The user can divide a retrieval key image into a plurality of retrieval key images. The user can divide one retrieval key corresponding to a document including a plurality of page images into retrieval key images corresponding to respective page images.

A retrieval key delete button 1017 allows the user to remove a retrieval key image from a set of retrieval keys. A retrieval start instruction area 1003 allows the user to activate retrieval processing.

A retrieval start button 1018 allows the user to start the retrieval processing. Upon pressing the retrieval start button 1018, a retrieval processing request is issued to the job archive application of the server system 140 using the retrieval conditions on the retrieval condition setting area 1001 and the retrieval key images on the retrieval key image input area 1002.

(Configuration Example of Document Retrieval Result List Window)

Figure 11:
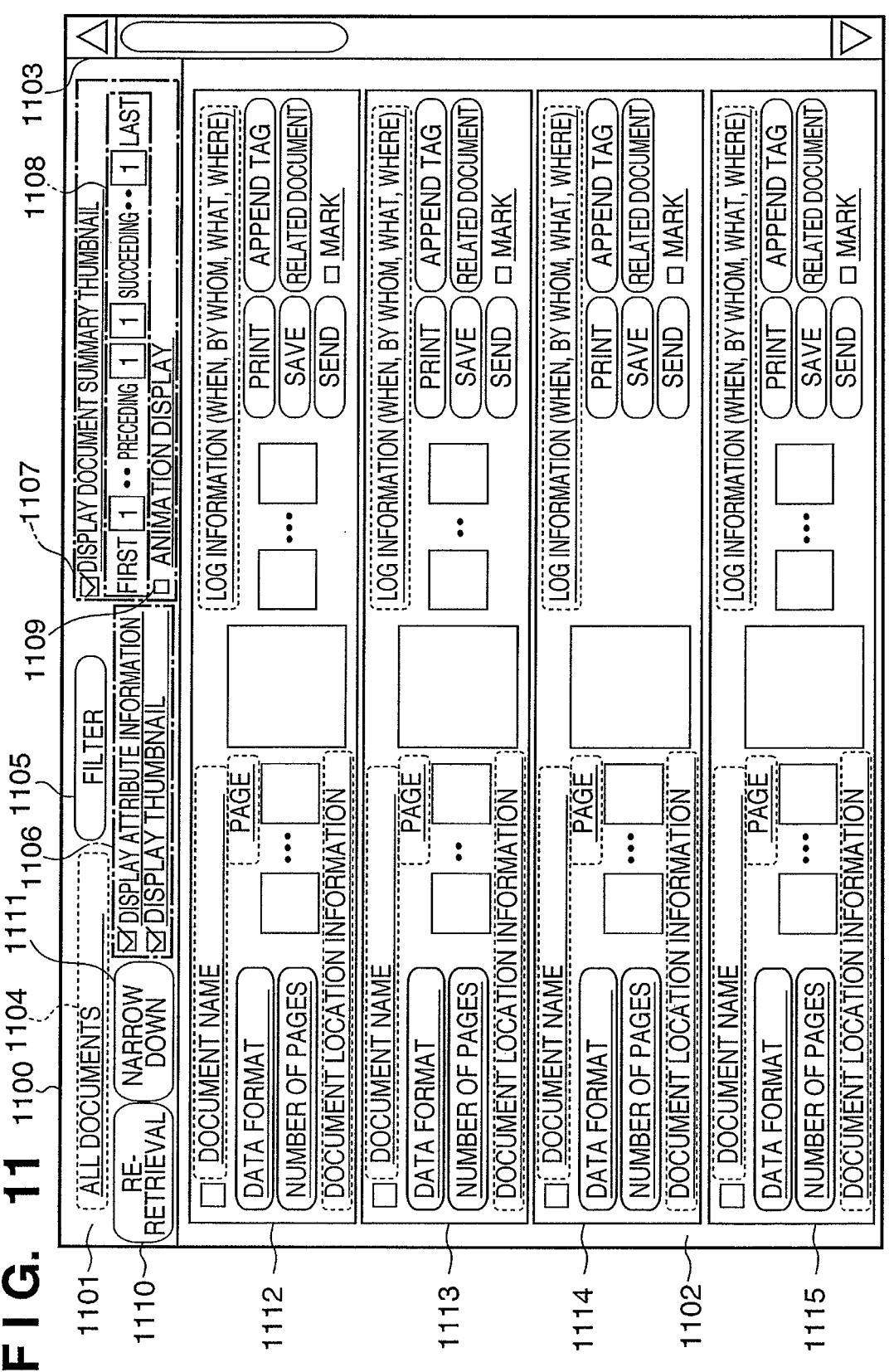
FIG. 11 shows a configuration example of a document retrieval result list window of the document retrieval application.

FIG. 11 shows an example of the configuration of the document retrieval result list window of the document retrieval application. A document retrieval result list window 1100 is an example of a window which displays retrieval results when the document retrieval application receives a response to the retrieval processing request from the job archive application. The document retrieval application of this embodiment displays the document retrieval result list window on the display area 702 of the operation unit 112. The document retrieval result list window 1100 includes a list manipulation area 1101, retrieval list display area 1102, and scroll bar 1103.

The retrieval list manipulation area 1101 is a manipulation setting area used to control display of the retrieval result list. A display filtering display field 1104 displays a display filter applied to a plurality of documents which hit as a result of retrieval, so as to leave a document group currently displayed on the retrieval list display area 1102. FIG. 11 shows a state in which the window displays "all documents" which hit as a result of retrieval.

The window can display all hit documents received from the retrieval unit 212 of the server system 140 (i.e., without filtering), or documents obtained by filtering hit documents according to the conditions of the display filter setting that is used to narrow down results.

A display filter setting button (filter) 1105 allows the user to set the display filter conditions. Upon pressing the display filter setting button 1105, a display filter setting window is opened to prompt the user to set desired filter conditions. The user can set conditions based on various kinds of information included in the document records 801 of hit documents as filter conditions. Also, the user can set conditions as pattern matching conditions for respective pieces of information stored in the document metadata 802, the page metadata 805 of page records 804 of hit pages, the job records 808 associated with documents, and the like. In other words, the user can set filter conditions similar to detailed retrieval options that he or she can set upon pressing the retrieval option button 1005.

For example, the user can set filtering based on the related documents and the log of the previous retrievals of the documents in addition to general filtering based on the document name, date and time of creation, tags, and the like. The user can set similarities between the retrieval conditions that are used as a retrieval key and document data as the display filter setting conditions used to narrow down results. Also, the user can set filtering based on other criteria such as the orientation of pages that form a document, i.e., portrait (vertically elongated) or landscape (horizontally elongated), and the like. Furthermore, the user can set filtering based on other criteria such as the paper size, the page range (n pages≤the number of pages<m pages), color, grayscale (continuous tone image), or monochrome binary image (binary image), the ratio of images and text, and the like. Moreover, the user can set filtering based on other criteria associated with jobs, i.e., when, where, by whom, and how the document was processed.

According to the embodiment, not only all hit documents as a result of retrieval are displayed on the retrieval list display area 1102, but also the filter that extracts the document which satisfies specific conditions and displays the extracted document as a list can be set. Furthermore, when the user changes the settings, the contents of the retrieval result list are updated. Hence, the user can easily retrieve a desired document from a large number of candidate documents.

A display item setting area 1106 controls items to be displayed per document upon displaying hit documents as a result of retrieval on the retrieval list display area 1102. Every time the user checks a check box or clicks a label character string assigned to that check box, the selected and non-selected states of the check box are alternately switched. When the user selects a "display attribute information" check box, metadata associated with a document such as a document name, data format, the number of pages, document location information, and the like are displayed on the retrieval list display area 1102. When the user selects a "display thumbnail" check box, a thumbnail image of each page which hits the retrieval conditions is displayed on the retrieval list display area 1102.

A document summary thumbnail setting area 1107 controls the display format of a document summary thumbnail to be displayed for each document upon displaying hit documents as a result of retrieval on the retrieval list display area 1102. When the user selects the "display thumbnail" check box on the display item setting area 1106, and also a "display document summary thumbnail" check box, a document summary thumbnail is displayed. The document summary thumbnail is a pair of thumbnails corresponding to pages which form a document, so as to allow the user to visually recognize the summary thereof.

A document summary thumbnail configuration setting area 1108 allows the user to set the configuration of a thumbnail group that forms a document summary thumbnail. On the document summary thumbnail configuration setting area 1108, four text input fields used to input numerical values are juxtaposed, and are respectively assigned "first", "preceding", "succeeding", and "last" label character strings. The user sets by the numerical value input to the "first" field how many pages, from the first page of the document, of thumbnails are to be displayed. The user sets by the numerical value input to the "preceding" field how many preceding pages, before the page that hits the retrieval conditions, of thumbnails are to be displayed. The user sets by the numerical value input to the "succeeding" field how many succeeding pages, after the page that hits the retrieval condition, of thumbnails are to be displayed. The user sets by the numerical value input to the "last" field how many pages, from the last page of the document, of thumbnails are to be displayed.

An animation display check box 1109 allows the user to set an animation display of the document summary thumbnail.

A re-retrieval button 1110 allows the user to return to the document retrieving window 1000.

A narrow-down retrieval button 1111 allows the user to return to the document retrieving window 1000 and to conduct a more narrow re-retrieval. The user marks a document to be added as a retrieval key (a document including an image to be added as a retrieval key) from documents displayed on the retrieval list display area 1102, and then presses the narrow-down retrieval button 1111. Upon pressing the narrow-down retrieval button 1111, the document retrieving window 1000 is re-displayed while the marked document is added to the retrieval key image display area 1010 as a retrieval key, and the narrow-down re-retrieval can be continued.

By simply adding adequate retrieval key images as much as possible, the retrieval hit rate (a rate of matching the set conditions) of a desired document can be improved, and a desired document can be easily retrieved. By analyzing the feature amount of the added retrieval key image and adjusting allocation of marks of various feature amounts upon determination of similarities, the similar image retrieval can be made according to the intention of the user.

More specifically, the retrieval key image to be added by the user for the narrow-down retrieval can be determined as a sample image having a subjectively high similarity from the viewpoint of the user who conducts the retrieval. Therefore, the user can adjust allocation of marks upon combining a plurality of feature amounts and similarity determination algorithms, so that the similarity of the retrieval key image is evaluated more highly. For example, when the similarity based on the shape is high and the similarity based on the tint is low between the original retrieval key images and the added retrieval key image, the narrow-down retrieval can be conducted to take priority of the shape-based similarity over the tint. Likewise, appropriate adjustments can be made to conduct a tint priority retrieval, color pattern priority retrieval, object structure tree similarity priority retrieval, and so forth.

The retrieval list display area 1102 displays a list of documents which match the retrieval conditions as a result of retrieval. Retrieval hit document display areas 1112, 1113, 1114, and 1115 respectively display information corresponding to documents which match the retrieval conditions and narrow-down conditions. In a default setting, documents with higher hit rates (rates of matching the set conditions) are displayed at higher rank positions of the list. In case of the same hit rates (rates of matching the set conditions), documents with higher document ranks obtained by numerically rating the document values are displayed at higher rank positions. The user can re-display the document list by sorting documents in an order other than the default order by pressing the display filter setting button 1105. For example, documents can be displayed in ascending or descending order based on various metadata associated with documents such as the date of creation, last reference date, data format, the number of pages, and location information of each document, the date of a job for that document, apparatus, processing contents, and the like. When the user re-sets the display order of the document list, the list display is immediately updated.

The document hit rates (rates of matching the set conditions) as a basis of the default display order will be briefly described hereinafter. The similar image retrieval is based on similarities unique to individual algorithms. In general, a similarity is a continuous amount that expresses a "similar degree", and is not a binary value "similar" or "not similar". However, upon implementation of the embodiment, an image whose similarity is lower than a predetermined threshold is processed as "not similar". As for an image whose similarity is higher than the predetermined threshold, an image with a relatively high similarity can be distinguished from an image with a low similarity. A hit rate (rate of matching the set conditions) is calculated based on the determination result of similarities between a retrieval key image included in the given retrieval conditions, and an image included in document data to be retrieved. That is, the hit rate of a document including an image with a high similarity is calculated to be higher than that of a document including an image with a low similarity.

Since a plurality of retrieval keys can be designated, the hit rate of a document which matches a larger number of retrieval conditions is calculated to be higher than a document which matches only a few retrieval conditions. When designating a plurality of retrieval key images of the similar image retrieval, if a document includes a large number of images with high similarities, its hit rate becomes high. Upon conducting a retrieval while the "include all keys" radio button is selected, no hit is determined unless that document matches all given retrieval keys.

Next, the document rank as a basis of the default display order will be described. The document rank is calculated as an index that represents a semantic importance of the document. The document rank is based on the importance which is explicitly assigned as metadata of the document. The document rank is calculated based on document attributes such as the degree of secrecy, owner, author, location, number of pages, and the like. Furthermore, the document rank can also be calculated based on the number and types of tags appended later to the document, the number of times of reference, a network of the cross-reference relations of related documents, and the like.

As the document rank based on the network of the cross-reference relations of related documents, the document rank of a document which is referred to from many documents with higher document ranks is calculated to be relatively high. The document rank of a document with a log indicating that it was processed simultaneously with a document with a high document rank (i.e., they are printed, sent, saved, or retrieved at the same time, their jobs are combined, etc.) is calculated to be relatively high.

By making the retrieval hit document display states of documents at lower ranks of the documents displayed on the retrieval list display area 1102 to be simpler than the display states of documents at higher ranks or reducing their display sizes, the total number of documents that can be displayed within one window can be increased.

According to the embodiment, in the default setting, the document list can be sorted and displayed based on the order of hit rates, order of document ranks, order of metadata appended to documents, order of jobs executed for the document, and the like. Furthermore, when the display order of the document list is re-set, the list display is updated immediately. Hence, a desired document can be easily retrieved from a large number of candidate documents.

The scroll bar 1103 allows the user to scroll the document retrieval result list window 1100. In many cases, since the retrieval list display area 1102 displays a large number of documents, those documents do not normally fall within the display area of the LCD display unit 501 of the operation unit 112. The user can find out a desired document by browsing documents while scrolling the window. Note that buttons (not shown) used to turn pages or the like may be allocated at, e.g., the lowermost portion of the retrieval list display area 1102, and the list of retrieval result documents may be divided into a plurality of pages to be displayed.

Note that the document retrieval result list may be printed out upon pressing a list print button (not shown) allocated at, e.g., the lowermost portion of the retrieval list display area 1102. A requirement of displaying a list of a largest possible number of documents within the limited display area and a requirement of allowing the user to select a desired document by visually comparing possibly detailed document summary thumbnails are competitive requirements which are difficult to satisfy at the same time. However, according to the embodiment, since the document retrieval result list can be immediately printed out, the user can easily retrieve a desired document using output sheets which have higher resolution and browsability than the touch panel display 502.

(Examples of Retrieval Hit Document Display)

The retrieval hit document display areas 1112, 1113, 1114, and 1115 shown in FIG. 11 are configured to have the same display format. Italic character strings indicate that actual values of corresponding metadata of a document are displayed on the window in practice. Underlined character strings allow opening of corresponding detailed information display windows upon pressing the display fields thereof, and allow the user to confirm the detailed information thereof.

Figure 12:
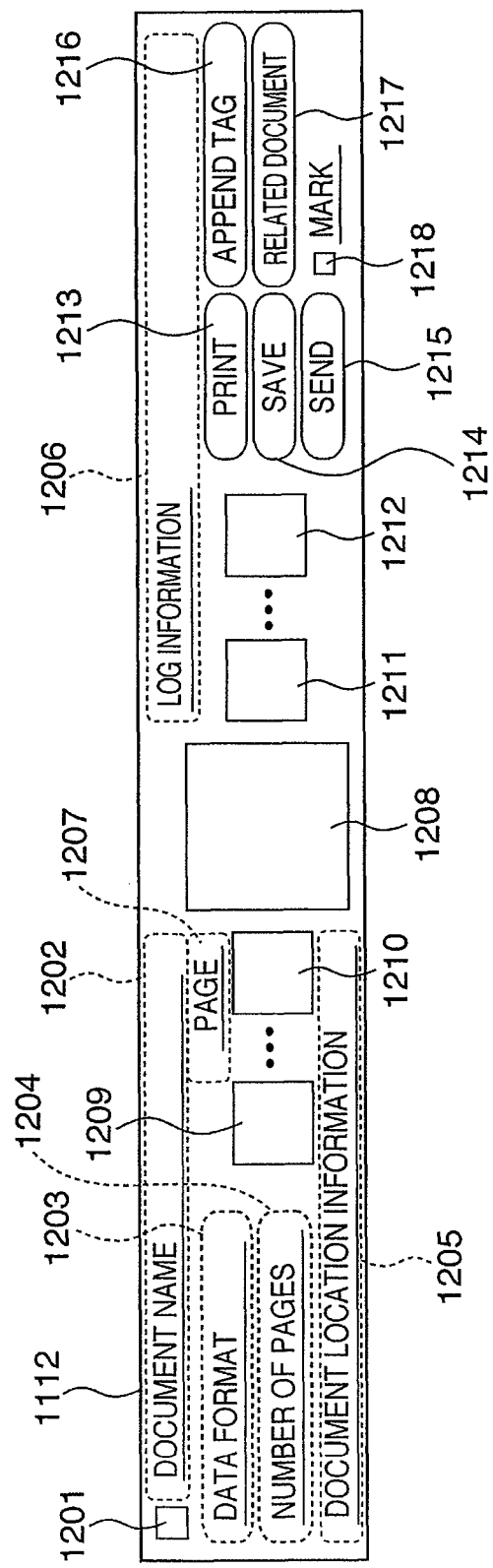
FIG. 12 shows an example of a retrieval hit document display.

FIG. 12 shows the retrieval hit document display area 1112 as an example of the retrieval hit document display area. A data format icon 1201 is used to display the data format of the corresponding document. A "document name" 1202 is a character string used to display the document name of the corresponding document. A "data format" 1203 is a character string used to display the data format of the corresponding document. A "number of pages" 1204 is a character string used to display the number of pages of the corresponding document. "Document location information" 1205 is a character string used to specify the storage location (place) such as a file server or the like where the corresponding document is saved. The document location information is identified by a URI or a file path character string in a file server and its file system. In case of documents accumulated by the job archive system, a location where copy data of documents to be processed collected by a job of the job archive system is saved may be displayed. Alternatively, when a location where original data of a document to be processed can be specified, the location may be displayed.

"Log information" 1206 is a character string used to express logs of job processes, retrievals, and the like previously applied to the corresponding document as an object to be processed. The user can confirm log information indicating when, by whom, by what kind of processing, and by which apparatus the document was processed.

A "page" 1207 is a character string used to express the page number of a page that hits the conditions of the retrieval keys that form the corresponding document.

A hit page thumbnail 1208 is a thumbnail image used to display an overview of a page or image element that hits the conditions of the retrieval keys of that form the corresponding document.

A first page thumbnail 1209 is a thumbnail image used to display an overview of the first page of the corresponding document. Thumbnail images numbering as many as the number of pages set on the document summary thumbnail configuration setting area 1108 are displayed in a row.

A preceding page thumbnail 1210 is a thumbnail image used to express an overview of pages before the page that hits the retrieval keys. Thumbnail images numbering as many as the number of pages set on the document summary thumbnail configuration setting area 1108 are displayed in a row. A succeeding page thumbnail 1211 is a thumbnail image used to express an overview of pages after the page that hits the retrieval keys. Thumbnail images numbering as many as the number of pages set on the document summary thumbnail configuration setting area 1108 are displayed in a row. A last page thumbnail 1212 is a thumbnail image used to express an overview of the last page of the corresponding document. Thumbnail images numbering as many as the number of pages set on the document summary thumbnail configuration setting area 1108 are displayed in a row. According to the embodiment, the hit page thumbnail 1208 is displayed in a large size, and thumbnails of other pages are displayed in a size smaller than the hit page thumbnail 1208. Given the present configuration, the user can clearly recognize the hit page.

A requirement of displaying a list of a largest possible number of documents within the limited display area, and a requirement of allowing the user to select a desired document by visually comparing possibly detailed document summary thumbnails are competitive requirements which are difficult to satisfy at the same time. However, according to the embodiment, since the user can easily change the page configuration to be displayed in the document summary thumbnail and the number of pages, he or she can easily retrieve a desired document.

When a very large number of pages are to be displayed within the document summary thumbnail, small thumbnails with a higher reduction scale are displayed to fall within the limited display area, thus adjusting the display of the retrieval result. Alternatively, display may be controlled as follows. That is, thumbnails of pages with relatively lower priority levels may be displayed in smaller sizes, or the thumbnails may be laid out so that preceding pages are partially superposed on succeeding pages. Alternatively, display of the retrieval result may be adjusted to fall within the limited display area by omitting some pieces of information of the retrieval result.

When the display area is insufficient, a page with high priority to be preferentially displayed in the document summary thumbnail can be selected according to the following algorithm. That is, an algorithm that preferentially selects younger pages of a document, preferentially selects pages which hit retrieval keys designated earlier, or preferentially selects pages with higher similarities when they hit the conditions of the similar image retrieval can be used.

A print button 1213 allows the user to print out the corresponding document using the print function. A save button 1214 allows the user to save the corresponding document in the box function. A send button 1215 allows the user to send the corresponding document by the send function.

An "append tag" button 1216 allows the user to manipulate tags of the corresponding document. Upon pressing the "append tag" button 1216, a document tag window is opened, and the user can browse and edit tags which are already set for the corresponding document and can additionally register new arbitrary tags.

A related document button 1217 allows the user to manipulate and set documents related to the corresponding document (related documents). Upon pressing the related document button 1217, a related document window is opened, and the user can browse and edit related documents related to the corresponding document. Also, the user can relate other documents to the corresponding document, and can register them as related documents.

A "mark" check box (mark) 1218 allows the user to mark the corresponding document. When the user wants to selectively manipulate some of the documents displayed on the list, he or she can manipulate documents that each have the check box in the selected state. For example, when the user sets the "mark" check box 1218 in the selected state, and then presses the narrow-down retrieval button 1111, a re-retrieval is conducted while the marked (selected) documents are added to the retrieval keys.

According to the embodiment, the user can recognize, using the document summary thumbnail, not only a page that hits the retrieval conditions, but also the context of the page and the global image of the document at a glance, so he or she can easily retrieve a desired document from the list.

(Display of Document Including a Plurality of Hit Pages)

Figure 13:
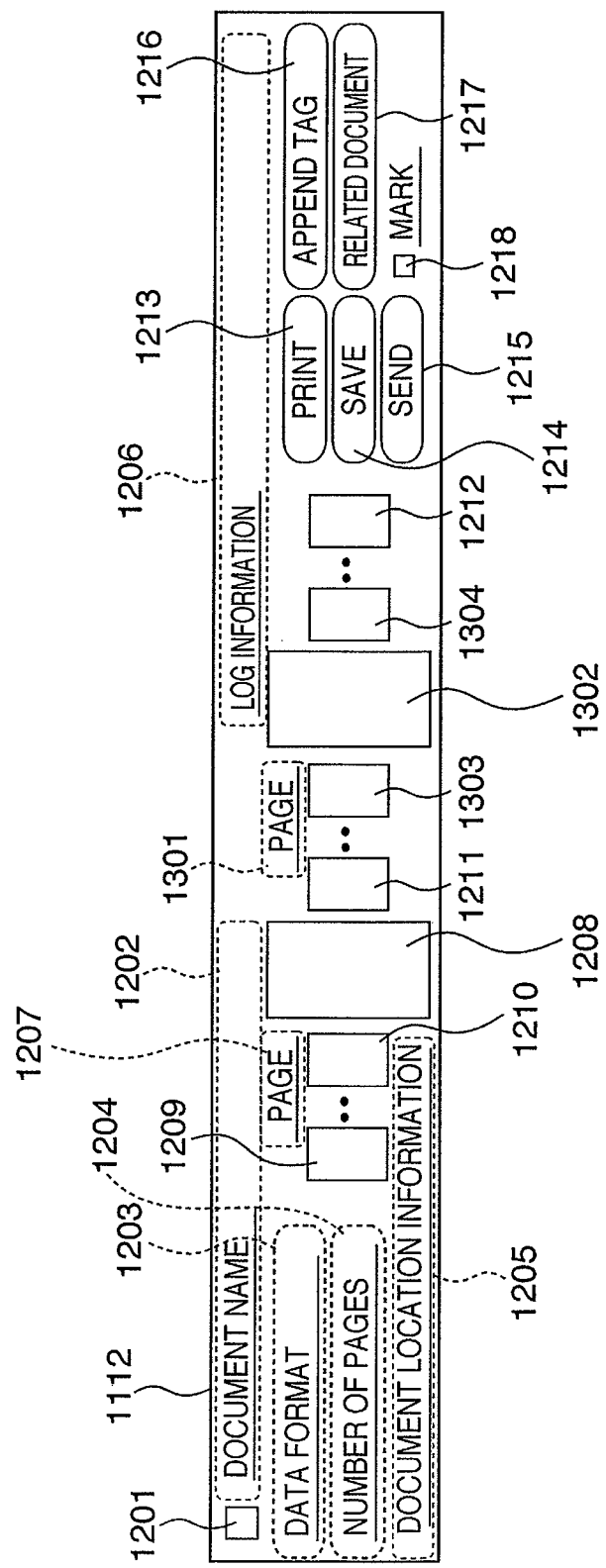
FIG. 13 shows an example of a retrieval hit document display of a document in which a plurality of pages hit.

FIG. 13 shows an example of a retrieval hit document display area of a document including a plurality of hit pages. The same reference numerals denote the aforementioned display items, and a repetitive description thereof will be avoided. Since the similar image retrieval is based on continuous similarities, a plurality of similar images included in one document are likely to hit the retrieval conditions. Since the retrieval can be conducted while setting a plurality of retrieval keys and conditions, a plurality of pages in one document are also likely to hit the retrieval conditions. FIG. 13 shows a display example associated with a document in which two hit page thumbnails 1208 and 1302 hit the retrieval conditions.

A "page" 1301 is a character string used to display the page number of the second page which hits the conditions of retrieval keys of those which form the corresponding document. A hit page thumbnail 1302 is a thumbnail image used to display an overview of the second page which hits the conditions of retrieval keys.

A preceding page thumbnail 1303 is a thumbnail image used to express an overview of pages before the second page which hits the retrieval keys. Thumbnail images as many as the number of pages set on the document summary thumbnail configuration setting area 1108 are displayed in a row.

A succeeding page thumbnail 1304 is a thumbnail image used to express an overview of pages after the page that hits the retrieval keys. Thumbnail images numbering as many as the number of pages set on the document summary thumbnail configuration setting area 1108 are displayed in a row.

A requirement of displaying a list of a largest possible number of documents within the limited display area, and a requirement of allowing the user to select a desired document by visually comparing possibly detailed document summary thumbnails are competitive requirements which are difficult to satisfy at the same time. However, according to the embodiment, since the user can easily change the page configuration to be displayed in the document summary thumbnail and the number of pages, he or she can easily retrieve a desired document.

In the display example of FIG. 13, as in FIG. 12, small thumbnails with a higher reduction scale are displayed to fall within the limited display area, thus adjusting the display of the retrieval result. Alternatively, display may be controlled as follows. That is, thumbnails of pages with relatively lower priority levels may be displayed in smaller sizes, or they may be laid out so that preceding pages are partially superposed on succeeding pages. Alternatively, display of the retrieval result may be adjusted to fall within the limited display area by omitting some pieces of information of the retrieval result.

When the display area is insufficient, priority levels are set for document summary thumbnail images. Pages with higher priority levels can be selected according to the following algorithm. That is, an algorithm that preferentially selects younger pages of a document, preferentially selects pages which hit retrieval keys designated earlier, or preferentially selects pages with higher similarities when they hit the conditions of the similar image retrieval can be used.

(Example of Animation Display of Document Summary Thumbnail)

Figure 14:
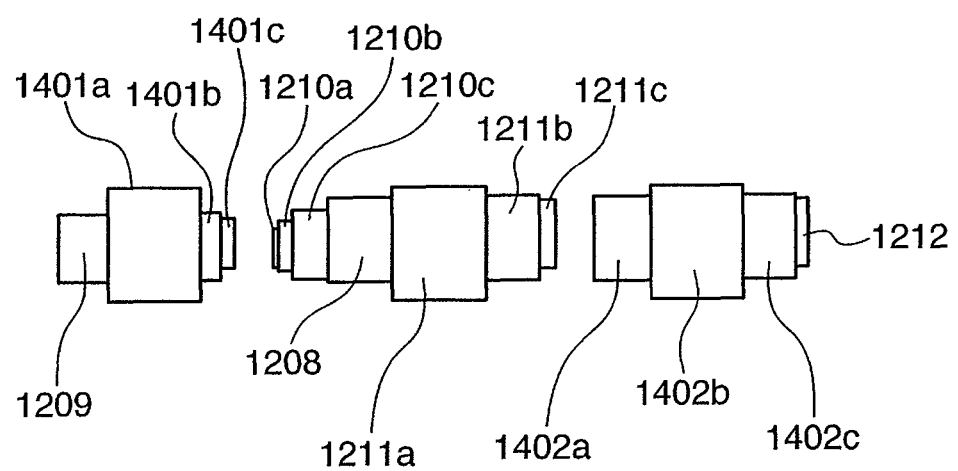
FIG. 14 shows an animation display example of document summary thumbnails.

FIG. 14 shows an animation display example of the document summary thumbnail. When the animation display check box 1109 is in the selected state, the document summary thumbnails in the retrieval hit document display areas 1112, 1113, 1114, and 1115 are automatically animated.

The first page thumbnail 1209 is a thumbnail image used to display an overview of the first page of the corresponding document. Thumbnail images numbering as many as the number of pages set on the document summary thumbnail configuration setting area 1108 are displayed in a row. In this case, when the user sets "four pages", the first page thumbnail 1209 of the document, and thumbnails 1401*a*, 1401*b*, and 1401*c* of the following second to fourth pages of the document are displayed in a row. Of the thumbnail images which represent the contents of the retrieved document data, each of the thumbnails 1209 and 1401*a* to 1401*c* of respective pages is automatically displayed in turn at the front position with respect to other thumbnail images and in an enlarged state (animation display). By animating the thumbnails as if pages were turned, the context and overview of a large number of pages in the document can be expressed by exploiting a small display area.

Preceding page thumbnails 1210a, 1210b, and 1210c are thumbnail images used to express an overview of pages before the page which hits the retrieval keys. Thumbnail images as many as the number of pages set on the document summary thumbnail configuration setting area 1108 are displayed in a row. FIG. 14 shows a state wherein the user sets "three pages".

The hit page thumbnail 1208 is a thumbnail image used to express an overview of the page which hits the conditions of the retrieval keys of those which form the corresponding documents.

Succeeding page thumbnails 1211a, 1211b, and 1211c are thumbnail images used to express an overview of pages after the page which hits the retrieval keys. Thumbnail images as many as the number of pages set on the document summary thumbnail configuration setting area 1108 are displayed in a row. FIG. 14 shows a state wherein the user sets "three pages".

Each of the thumbnails 1210a to 1210c, 1208, and 1211a to 1211c of respective pages is automatically displayed in turn at the front position with respect to other thumbnail images and in an enlarged state. By animating the thumbnails as if pages were turned, the context of a large number of pages in the document can be expressed by exploiting a small display area.

The last page thumbnail 1212 is a thumbnail image used to display an overview of the last page of the corresponding document. Thumbnail images numbering as many as the number of pages set on the document summary thumbnail configuration setting area 1108 are displayed in a row. In such a circumstance, when the user sets "four pages", the last page thumbnail 1212 of the document, and thumbnails 1402a, 1402b, and 1402c of the second to fourth pages counted from the last of the document are displayed in a row. Each of the thumbnails 1402a to 1402c and 1212 of respective pages is automatically displayed in turn at the front position with respect to other thumbnail images and in an enlarged state (animation display). By animating the thumbnails as if pages were turned, the context and overview of a large number of pages in the document can be expressed by exploiting a small display area.

A requirement of displaying a list of a largest possible number of documents within the limited display area, and a requirement of allowing the user to select a desired document by visually comparing possibly detailed document summary thumbnails are competitive requirements which are difficult to satisfy at the same time.

However, according to the embodiment, since the document summary thumbnail images are configured to be automatically animated, the competitive requirements can be simultaneously satisfied.

(Display. Example of Document Retrieval Result List Window in Dense Mode)

FIG. 15 shows an example of the display configuration of the document retrieval result list window of the document retrieving application in a dense display mode.

A document retrieval result list window 1500 corresponds to another mode of the document retrieval result list display example shown in FIG. 11. When the "display attribute information" check box on the display item setting area 1106 is not selected, metadata associated with each document to be displayed on the retrieval list display area 1101 are omitted as much as possible, and a list of a largest possible number of hit documents is displayed on the window instead. The same reference numerals denote the same elements as those on the document retrieval result list window 1100 shown in FIG. 11, and a repetitive description thereof will be avoided.

A detail button 1501 is used to open a window that allows the user to confirm detailed information, whose display is omitted, associated with a document. Upon pressing this button, a detailed information display window which is the same as the display window shown in FIG. 13 is opened.

Document summary thumbnail animation display areas 1502a to 1502i (to be also simply described as a "display area 1502" hereinafter) are used to animation-display the document summary thumbnails.

In the dense display mode, in order to allow the user to find out a desired document from a large number of retrieval result documents, a largest possible number of retrieval result documents are simultaneously displayed within one window. As the display area 1502 used to display the document summary thumbnail, only a display size for one page is assured. Hence, when the animation display check box 1109 is selected, display of the display area 1502 is time-shared. The display of the display area 1502 is time-shared to execute animation display that automatically switch pages (or image elements) in turn as if pages were turned. The animation display allows the user to recognize characteristic pages which help him or her understand an overview of pages which form a document and the context including the retrieval hit page.

(Sequence of Document Summary Thumbnail Animation Display Processing)

Figure 16A:
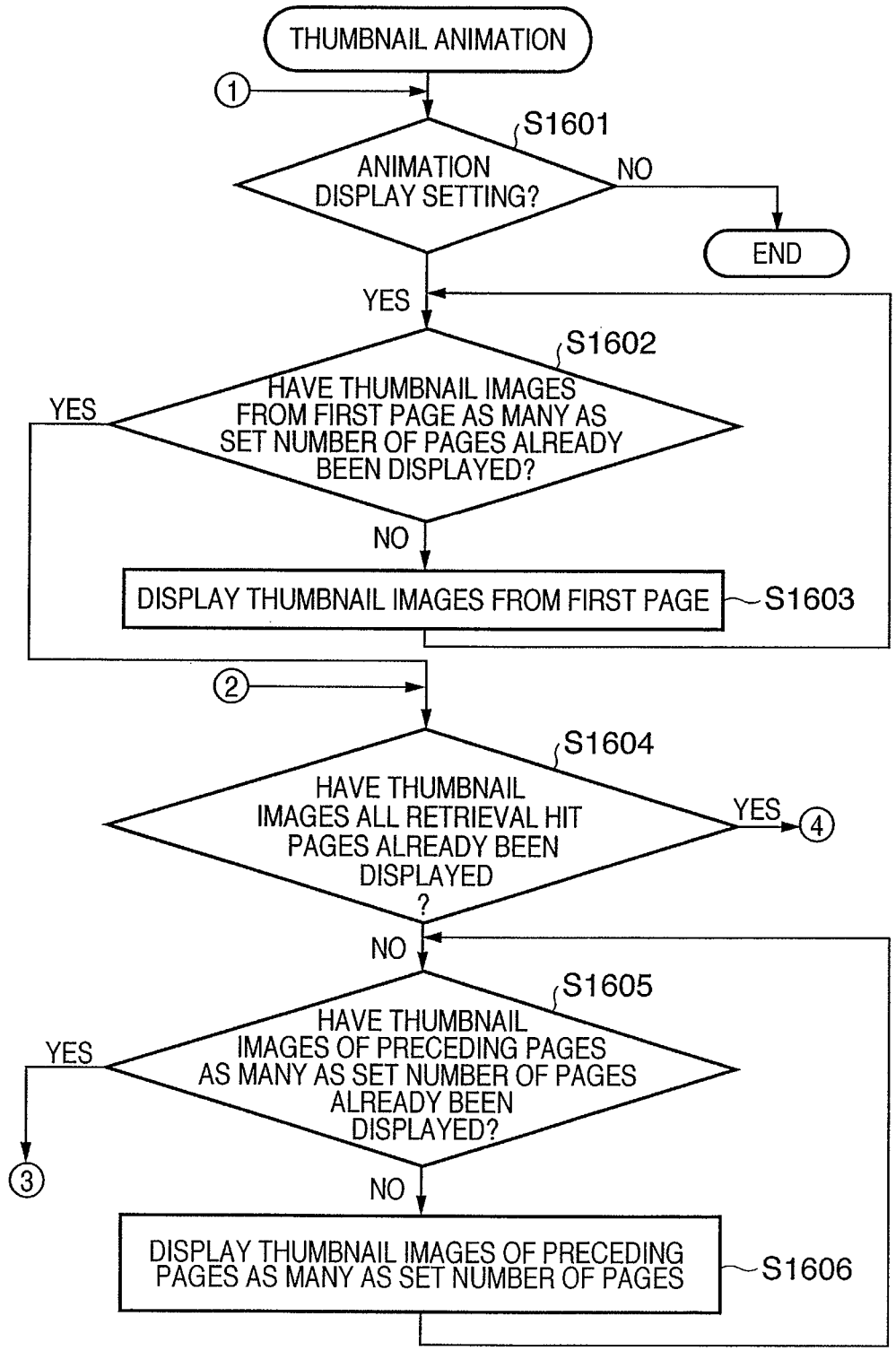
FIGS. 16A and 16B are flowcharts showing the sequence of document summary thumbnail animation display processing.
Figure 16B:
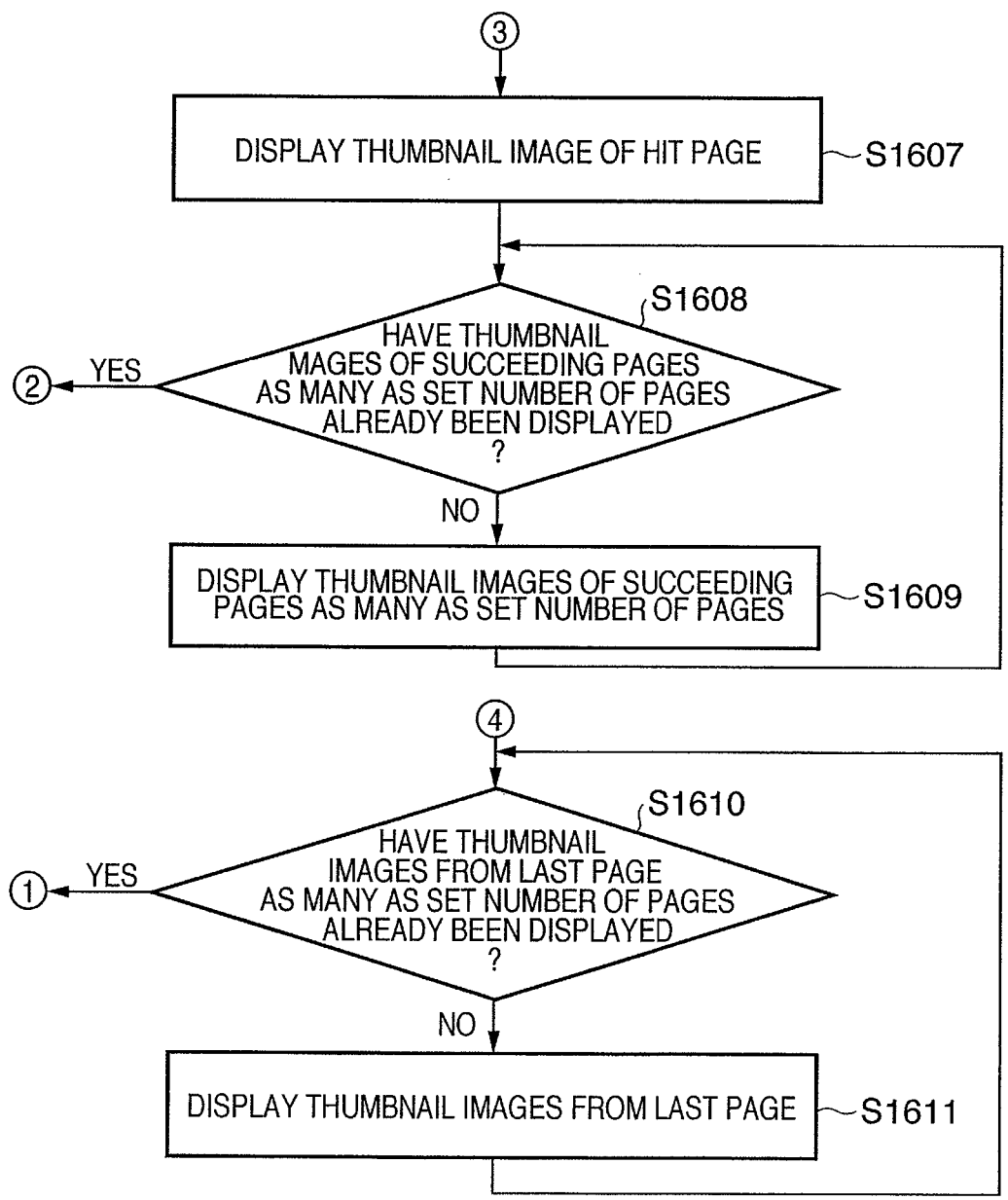

FIGS. 16A and 16B are flowcharts showing the sequence of the document summary thumbnail animation display processing. The display processing is implemented by the document retrieving application executed by the CPU 301 of the image processing apparatus 110.

A series of sequences of the flowchart is executed in parallel for each of the document summary thumbnail animation display areas 1502a to 1502i of all displayed documents when the document retrieval result list window in the dense display mode in FIG. 15 is displayed. In the following description, these display areas 1502a to 1502i will be described as a document summary thumbnail animation display area 1502.

The document retrieving application checks in step S1601 if the animation display is set. If the animation display check box 1109 is selected (YES in S1601), the process advances to step S1602; otherwise (NO in S1601), this processing ends.

The application checks in step S1602 if thumbnail images from the first page numbering as many as the number of pages, which is set on the document summary thumbnail configuration setting area 1108, have already been displayed. If the thumbnail images have already been displayed (YES in S1602), the process jumps to step S1604; otherwise (NO in S1602), the process advances to step S1603.

In step S1603, the application displays the thumbnail images from the first page on the document summary thumbnail animation display area 1502, and the process returns to step S1602. Given the present loop, the thumbnail images from the first page numbering as many as the set number of pages are sequentially animated.

The application checks in step S1604 if thumbnail images of retrieval hit pages have already been displayed. If the thumbnail images have already been displayed (YES in S1604), the process jumps to step S1610; otherwise (NO in S1604), the process advances to step S1605.

The application checks in step S1605 if thumbnail images of preceding pages numbering as many as the number of pages, which is set on the document summary thumbnail configuration setting area 1108, have already been displayed. If the thumbnail images have already been displayed (YES in S1605), the process jumps to step S1607; otherwise (NO in S1605), the process advances to step S1606.

In step S1606, the application displays the thumbnail images of preceding pages numbering as many as the set number of pages on the document summary thumbnail animation display area 1502, and the process returns to step S1605. Given the present loop, the thumbnail images of preceding pages numbering as many as the number of pages which that is set in association with the retrieval hit page are sequentially animated.

In step S1607, the application also displays the thumbnail image of that retrieval hit page on the document summary thumbnail animation display area 1502.

The application checks in step S1608 if thumbnail images of succeeding pages numbering as many as the number of pages, which is set on the document summary thumbnail configuration setting area 1108 in associated with one retrieval hit page, have already been displayed. If the thumbnail images have already been displayed (YES in S1608), the process returns to step S1604; otherwise (NO in S1608), the process advances to step S1609.

In step S1609, the application displays the thumbnail images of succeeding pages numbering as many as the set number of pages on the document summary thumbnail animation display area 1502, and the process returns to step S1608. Given the present loop, the thumbnail images of succeeding pages numbering as many as the number of pages, which is set in association with the retrieval hit page, are sequentially animated.

On the other hand, if the condition in step S1608 is true and the process returns to step S1604, the loop allows sequentially animating of thumbnails of each retrieval hit page and its preceding and succeeding pages, in association with all of the retrieval hit pages in the document.

The application checks in step S1610 if thumbnail images from the last page numbering as many as the number of pages, which is set on the document summary thumbnail configuration setting area 1108, have already been displayed. If the thumbnail images have already been displayed (YES in S1610), the process returns to step S1601; otherwise (NO in S1610), the process advances to step S1611.

In step S1611, the application displays the thumbnail image of the last page on the document summary thumbnail animation display area 1502, and the process returns to step S1610. Given the present loop, thumbnails from the last pages, numbering as many as the set number of pages, are sequentially animated.

In order to animate thumbnail images, the display can be switched for respective time frames based on a timer setting. According to the priority levels for respective pages in the document summary thumbnail, a page with high priority may be displayed for a long period of time, and a page with low priority may be displayed only for a short period of time.

A page with high priority to be preferentially displayed in the document summary thumbnail can be selected according to the following algorithm. That is, an algorithm that preferentially selects younger pages of a document, preferentially selects pages which hit retrieval keys designated earlier, or preferentially selects pages with higher similarities when they hit the conditions of the similar image retrieval can be used.

Note that thumbnails of pages which are not set on the document summary thumbnail configuration setting area 1108 may be displayed only for a very short period of time. Given the present configuration, since important pages associated with an overview of the document or the context including the hit page in the document are displayed for a relatively long period of time according to their importance levels, the impressions of the overview of the document and the context of the hit page can be enhanced.

A requirement of displaying a list of a largest possible number of documents within the limited display area, and a requirement of allowing the user to select a desired document by visually comparing possibly detailed document summary thumbnails are competitive requirements which are difficult to satisfy at the same time.

However, according to the embodiment, since the document summary thumbnail images are configured to be automatically animated, the competitive requirements can be simultaneously satisfied.

Second Embodiment

According to the first embodiment, document summary thumbnails are displayed using pages that form a document as a unit. However, the second embodiment will describe a configuration that displays document summary thumbnails to have individual image area elements that form a document as a unit.

Figure 17:
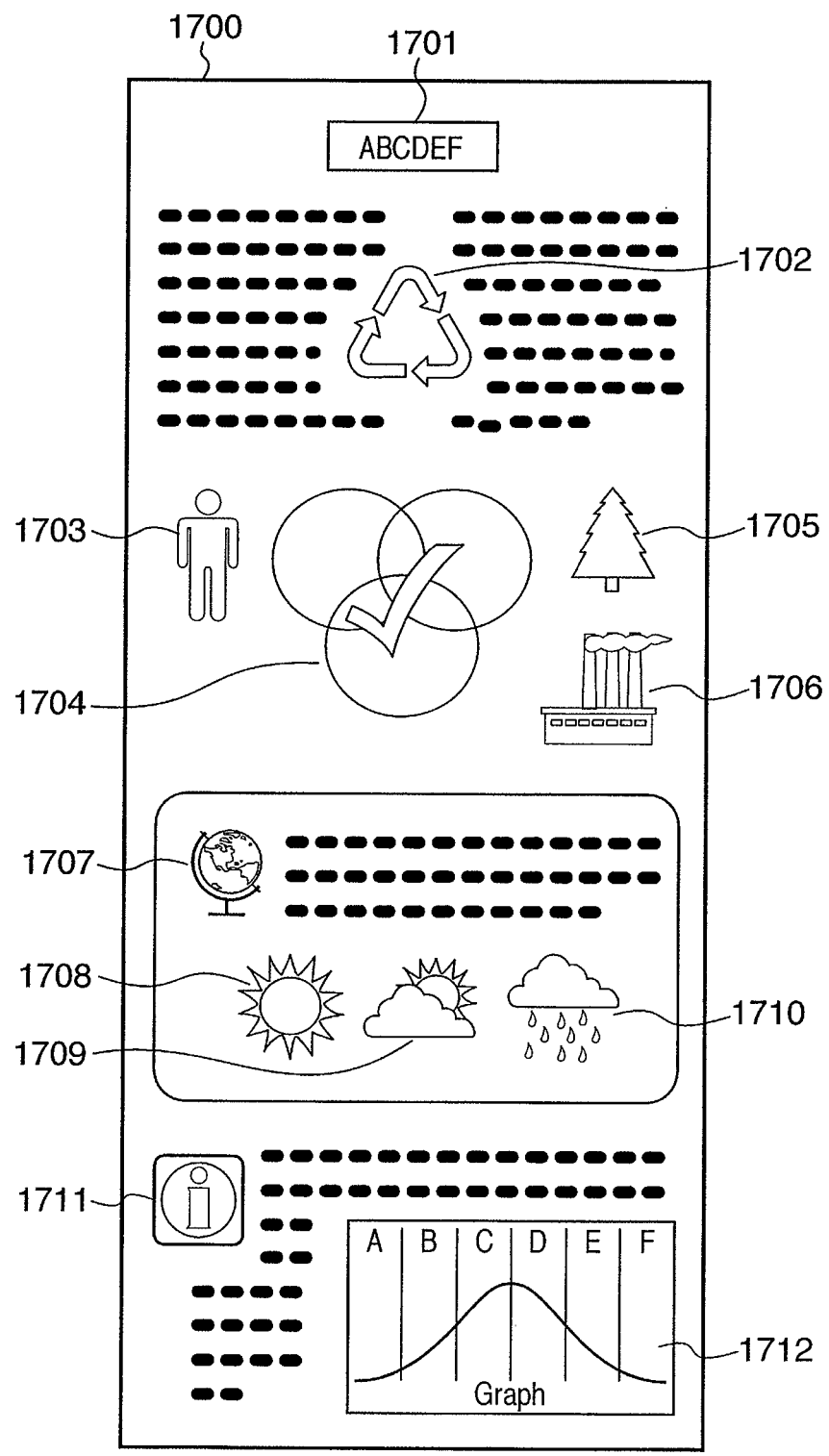
FIG. 17 shows an example of a document configured by a plurality of image region elements.

FIG. 17 shows an example of a document formed of a plurality of image area elements.

A document 1700 is an example of a document formed of a plurality of image areas and text areas. Structure information associated with the structure of a page is obtained as a result of analysis of the document 1700 by the image structure analysis unit 208 or rendering unit 210, and elements such as a plurality of images and a plurality of text elements that form the document can be decomposed. Also, the cross relationship among elements can be obtained as structure information by analysis based on the distance between elements on the allocation, the custom of the allocation and context determined by culture, and the like. Note that when a document is described by code data such as HTML or the like, the data itself often describes the relationship among elements.

The document 1700 includes image elements 1701 to 1712. The image elements can be analyzed to have the context in ascending order of reference numerals, based on the cultural custom that they are allocated from left to right, top to bottom.

Figure 18:
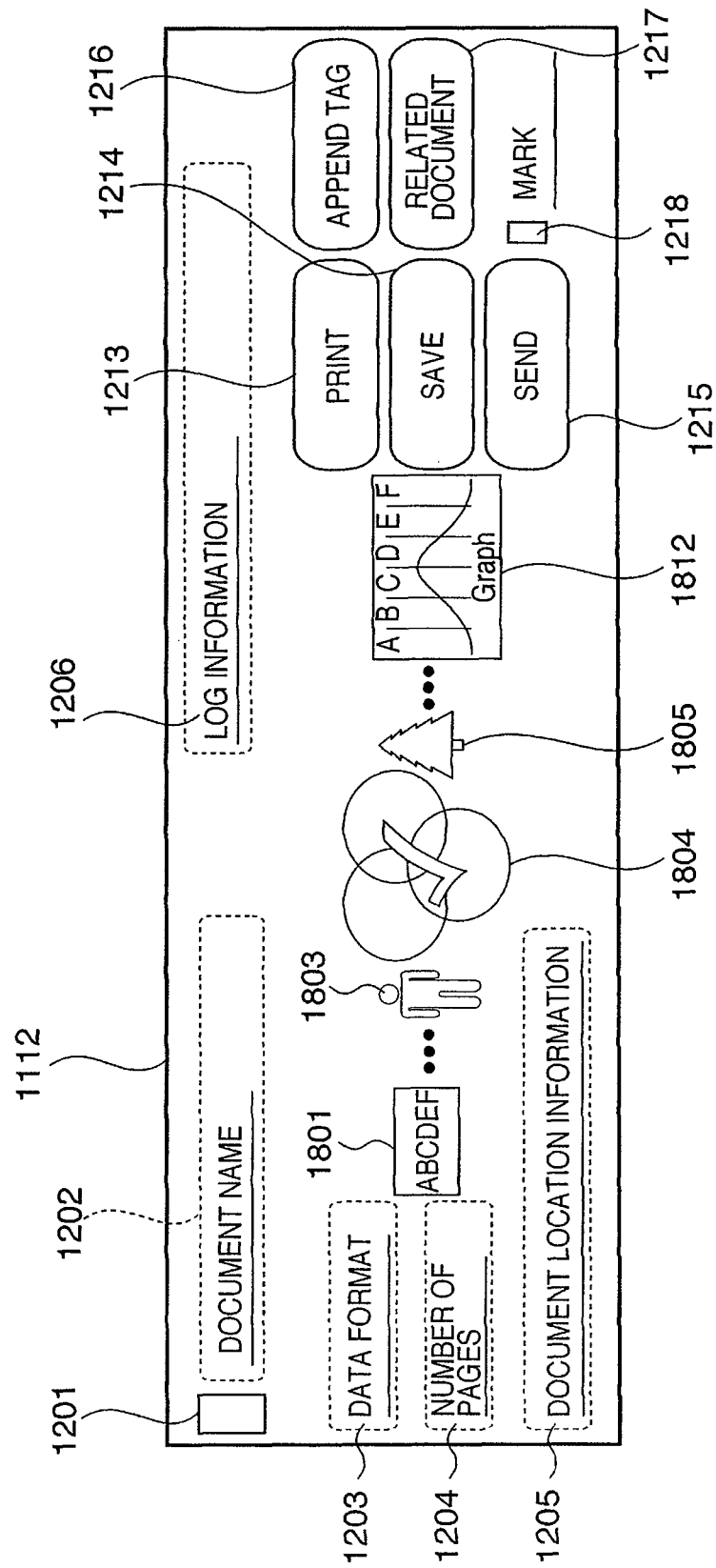
FIG. 18 shows an example of a retrieval hit document display according to the second embodiment.

FIG. 18 shows an example of a retrieval hit document display area according to the second embodiment. The retrieval hit document display area example of FIG. 18 assumes a state wherein a retrieval is conducted using an image similar to the image element 1704 as a key, and the document 1700 shown in FIG. 17 hits. The retrieval hit document display area in FIG. 18 has the same configuration as the example of the retrieval hit document display area shown in FIG. 12 of the first embodiment. Hence, the same reference numerals denote common elements, and a repetitive description thereof will be avoided.

A hit image thumbnail 1804 is a thumbnail image used to display an overview of an image element that hits the conditions of the retrieval key of the conditions that form the corresponding document. The thumbnail corresponds to the image element 1704 that forms the document 1700 in FIG. 17.

A first image thumbnail 1801 is a thumbnail image used to express an overview of the first image element of the corresponding document. The thumbnail corresponds to the image element 1701, which forms the document 1700 in FIG. 17. Thumbnail images numbering as many as the number of pages set on a setting area (not shown) similar to the document summary thumbnail configuration setting area 1108 can be displayed in a row.

A preceding image thumbnail 1803 is a thumbnail image used to display an overview of an image element that precedes the image element that hits the retrieval key. The thumbnail corresponds to the image element 1703, which forms the document 1700 in FIG. 17. Thumbnail images numbering as many as the number of pages set on a setting area (not shown) similar to the document summary thumbnail configuration setting area 1108 can be displayed in a row.

A succeeding image thumbnail 1805 is a thumbnail image used to express an overview of an image element, which follows the image element that hits the retrieval key. The thumbnail corresponds to the image element 1705 which forms the document 1700 in FIG. 17. Thumbnail images as many as the number of pages set on a setting area (not shown) similar to the document summary thumbnail configuration setting area 1108 can be displayed in a row.

A last image thumbnail 1812 is a thumbnail image used to express an overview of the last image element of the corresponding document. The thumbnail corresponds to the image element 1712, which forms the document 1700 in FIG. 17. Thumbnail images numbering as many as the number of pages set on a setting area (not shown) similar to the document summary thumbnail configuration setting area 1108 can be displayed in a row.

A requirement of displaying a list of a largest possible number of documents within the limited display area, and a requirement of allowing the user to select a desired document by visually comparing possibly detailed document summary thumbnails are competitive requirements which are difficult to satisfy at the same time.

According to the embodiment, since the user can easily change the image element configuration to be displayed in the document summary thumbnail and the number of image elements, he or she can easily retrieve a desired document.

When a very large number of image elements are to be displayed within the document summary thumbnail, small thumbnails with a higher reduction scale are displayed to fall within the limited display area, thus adjusting the display of the retrieval result. Alternatively, display may be controlled as follows. That is, thumbnails of image elements with relatively lower priority levels may be displayed in smaller sizes, or image elements may be laid out so that preceding pages are partially superposed on succeeding pages. Alternatively, display of the retrieval result may be adjusted to fall within the limited display area by omitting some display contents.

When the display area is insufficient, an image element with high priority to be preferentially displayed in the document summary thumbnail can be selected according to the following algorithm. That is, an algorithm that preferentially selects image elements with younger numbers of a document, preferentially selects image elements which hit retrieval keys designated earlier, or preferentially selects image elements with higher similarities when they hit the conditions of the similar image retrieval can be used.

The document summary thumbnails using image elements as a unit can be animated in the same sequence as in the display example of FIG. 14 and the sequence in FIGS. 16A and 16B, and the context and overview of a large number of image elements arranged in the document can be displayed by exploiting a small display area.

Other Embodiments

Note that the objects of the present invention are also achieved by supplying a storage medium, which records a program code of software that can implement the functions of the above-mentioned embodiments upon a system or apparatus. Also, the objects can be achieved when a computer (or a CPU or MPU) of the system or apparatus reads out and executes the program code stored in the storage medium.

In such a circumstance, the program code itself read out from the storage medium implements the functions of the aforementioned embodiments, and the storage medium which stores the program code constitutes the present invention.

As the storage medium for supplying the program code, for example, a flexible disk, hard disk, optical disk, magneto-optical disk, CD-ROM, CD-R, nonvolatile memory card, ROM, and the like may be used.

The functions of the above-mentioned embodiments are implemented when the computer executes the readout program code. Also, an OS (operating system) running on the computer executes some or all of actual processing operations on the basis of an instruction of the program code to implement the above-mentioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-336375, filed Dec. 13, 2006, which is hereby incorporated by reference herein in its entirety.

What is claimed is:

1. A document retrieving apparatus comprising:
   a document retrieving unit constructed to retrieve, from a plurality of document data, document data which includes a page that matches an input retrieval condition;
   a retrieval result display unit constructed to display, on a display unit, the document data which includes the page that matches the retrieval condition based on a retrieval result of the document retrieving unit;
   a setting unit constructed to set an arrangement of a number of pages to be displayed as thumbnails in advance, in a case where at least a first page, a page neighboring the first page, a top page, and a last page, which form the document data which includes the page that matches the retrieval condition, are displayed as thumbnails; and
   a thumbnail display unit constructed to display a first thumbnail and a second thumbnail,
   wherein the setting unit is configured to set the number of pages, from the page neighboring the first page, of the thumbnails to be displayed, and set the number of pages, from the top page of the document data, of the thumbnails to be displayed, and set the number of pages, from the last page of the document data, of the thumbnails to be displayed, wherein the first thumbnail is of the page that matches the retrieval condition in the document data, and the second thumbnail is of a page which forms the document data and is selected from the document data based on the arrangement of the pages and the number of pages set by the setting unit in advance, wherein the thumbnail display unit does not display, as the second thumbnail, a thumbnail of a page which is not selected based on the arrangement of the pages set by the setting unit in advance, and wherein at least one of the document retrieving unit, the retrieval result display unit, the setting unit and the thumbnail display unit comprises a processor and a computer-readable storage medium.

2. The apparatus according to claim 1, wherein the thumbnail display unit displays the second thumbnail based on an arrangement order of pages to be allocated before or after the first thumbnail.

3. The apparatus according to claim 1, wherein the thumbnail display unit displays the first thumbnail to have a size larger than the second thumbnail.

4. The apparatus according to claim 1, wherein the retrieval condition includes a retrieval key image, which uses at least one of a scanned image and an image saved in a storage device.

5. The apparatus according to claim 1, wherein when one document data includes a plurality of pages which match the retrieval condition, the thumbnail display unit displays a plurality of first thumbnails associated with the pages which match the retrieval condition.

6. A document retrieving method for a document retrieving apparatus which comprises a display unit, the method comprising:

a document retrieving step of retrieving, from a plurality of document data, document data which includes a page that matches an input retrieval condition;

a retrieval result display step of displaying, on the display unit, the document data which includes the page that matches the retrieval condition based on a retrieval result of the document retrieving step;

a setting step of setting an arrangement of a number of pages to be displayed as thumbnails in advance, in a case where at least a first page, a page neighboring the first page, a top page, and a last page, which form the document data which includes the page that matches the retrieval condition, are displayed as thumbnails; and a thumbnail display step of displaying a first thumbnail and a second thumbnail, wherein the setting step sets the number of pages, from the page neighboring the first page, of the thumbnails to be displayed, and sets the number of pages, from the top page of the document data, of the thumbnails to be displayed, and sets the number of pages, from the last page of the document data, of the thumbnails to be displayed, wherein the first thumbnail is of the page that matches the retrieval condition in the document data, and the second thumbnail is of a page which forms the document data and is selected from the document data based on the arrangement of the pages and the number of pages set by the setting step in advance, and wherein the thumbnail display step does not display, as the second thumbnail, a thumbnail of a page which is not selected based on the arrangement of the pages set by the setting step in advance.

7. A non-transitory computer-readable storage medium retrievably storing a computer program which instructs a microprocessor to perform a document retrieving method for a document retrieving apparatus which includes a display unit, the program comprising:

a document retrieving step of retrieving, from a plurality of document data, document data which includes a page that matches an input retrieval condition;

a retrieval result display step of displaying, on the display unit, the document data which includes the page that matches the retrieval condition based on a retrieval result of the document retrieving step;

a setting step of setting an arrangement of a number of pages to be displayed as thumbnails in advance, in a case where at least a first page, a page neighboring the first page, a top page, and a last page, which form the document data which includes the page that matches the retrieval condition, are displayed as thumbnails; and a thumbnail display step of displaying a first thumbnail and a second thumbnail, wherein the setting step sets the number of pages, from the page neighboring the first page, of the thumbnails to be displayed, and sets the number of pages, from the top page of the document data, of the thumbnails to be displayed, and sets the number of pages, from the last page of the document data, of the thumbnails to be displayed, wherein the first thumbnail is of the page that matches the retrieval condition in the document data, and the second thumbnail is of a page which forms the document data and is selected from the document data based on the arrangement of the pages and the number of pages set by the setting step in advance, and wherein the thumbnail display step does not display, as the second thumbnail, a thumbnail of a page which is not selected based on the arrangement of the pages set by the setting step in advance.

* * * * *